United States Patent
Wu et al.

(10) Patent No.: US 12,498,831 B2
(45) Date of Patent: Dec. 16, 2025

(54) ELECTRONIC DEVICE

(71) Applicant: InnoLux Corporation, Miao-Li County (TW)

(72) Inventors: Yuan-Lin Wu, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 57 days.

(21) Appl. No.: 18/408,540

(22) Filed: Jan. 9, 2024

(65) Prior Publication Data

US 2024/0264707 A1  Aug. 8, 2024

(30) Foreign Application Priority Data

Feb. 2, 2023 (CN) .......................... 202310078683.1

(51) Int. Cl.
   G09G 5/00 (2006.01)
   G06F 3/041 (2006.01)
   G06F 3/044 (2006.01)
   H10K 59/40 (2023.01)

(52) U.S. Cl.
   CPC ...... *G06F 3/0446* (2019.05); *G06F 3/041662* (2019.05); *G06F 3/0445* (2019.05); *H10K 59/40* (2023.02); *G06F 2203/04102* (2013.01); *G06F 2203/04111* (2013.01); *G06F 2203/04112* (2013.01)

(58) Field of Classification Search
   CPC ................. G06F 3/0446; G06F 3/0445; G06F 3/041662; G06F 2203/04102; G06F 2203/04111; G06F 2203/04112; H10K 59/40
   USPC ........................................................ 345/174
   See application file for complete search history.

(56) References Cited

U.S. PATENT DOCUMENTS

| | | | |
|---|---|---|---|
| 2015/0268761 A1* | 9/2015 | Yang | G06F 3/0446 345/174 |
| 2021/0405819 A1 | 12/2021 | Seo et al. | |
| 2022/0028932 A1* | 1/2022 | Lee | G06F 3/0412 |
| 2022/0107708 A1 | 4/2022 | Jeong et al. | |
| 2022/0223656 A1 | 7/2022 | Kim | |
| 2022/0413657 A1* | 12/2022 | Byun | G06F 3/0443 |
| 2024/0248571 A1* | 7/2024 | Kim | G06F 3/04164 |
| 2024/0264685 A1* | 8/2024 | Xu | G06F 3/0445 |

FOREIGN PATENT DOCUMENTS

| | | |
|---|---|---|
| CN | 113238677 A | 8/2021 |
| TW | 202004283 | 1/2020 |

* cited by examiner

*Primary Examiner* — Jennifer T Nguyen
(74) *Attorney, Agent, or Firm* — Winston Hsu

(57) ABSTRACT

The present disclosure provides an electronic device including a substrate and a sensing structure. The sensing structure is disposed on the substrate, and includes a first conductive layer, a second conductive layer disposed on the first conductive layer, and an insulating layer disposed between the first conductive layer and the second conductive layer. The second conductive layer is at least partially overlapped with the first conductive layer. A thickness of the second conductive layer is greater than a thickness of the first conductive layer.

18 Claims, 15 Drawing Sheets

ELECTRONIC DEVICE

BACKGROUND OF THE DISCLOSURE

1. Field of the Disclosure

The present disclosure relates to an electronic device and particularly to an electronic device with a sensing structure.

2. Description of the Prior Art

Since electronic devices are able to meet various requirements of users, they have become an essential tool in people's lives. For example, some of the electronic devices have been developed to have both a display function and a touch function so as to perform human-computer interaction. However, in a conventional electronic device, a touch panel configured to detect a stylus is attached to a lower side of a panel with the display function. Therefore, the cost of the conventional electronic device cannot be further reduced and its overall thickness and weight also cannot be reduced due to the design of the conventional electronic device. In addition, when applied to a foldable electronic device, it is difficult to attach the touch panel to the folding region, and it needs to divide the touch panel into two pieces to attach to the folding region. As a result, the sensitivity in the folding region is poor.

SUMMARY OF THE DISCLOSURE

According to some embodiments of the present disclosure, an electronic device is provided and includes a substrate and a sensing structure. The sensing structure is disposed on the substrate. The sensing structure includes a first conductive layer, a second conductive layer and an insulating layer. The second conductive layer is disposed on the first conductive layer, and the insulating layer is disposed between the first conductive layer and the second conductive layer. The second conductive layer is at least partially overlapped with the first conductive layer. A thickness of the second conductive layer is greater than a thickness of the first conductive layer.

These and other objectives of the present disclosure will no doubt become obvious to those of ordinary skill in the art after reading the following detailed description of the embodiment that is illustrated in the various FIGS. and drawings.

DETAILED DESCRIPTION

Figure 1:
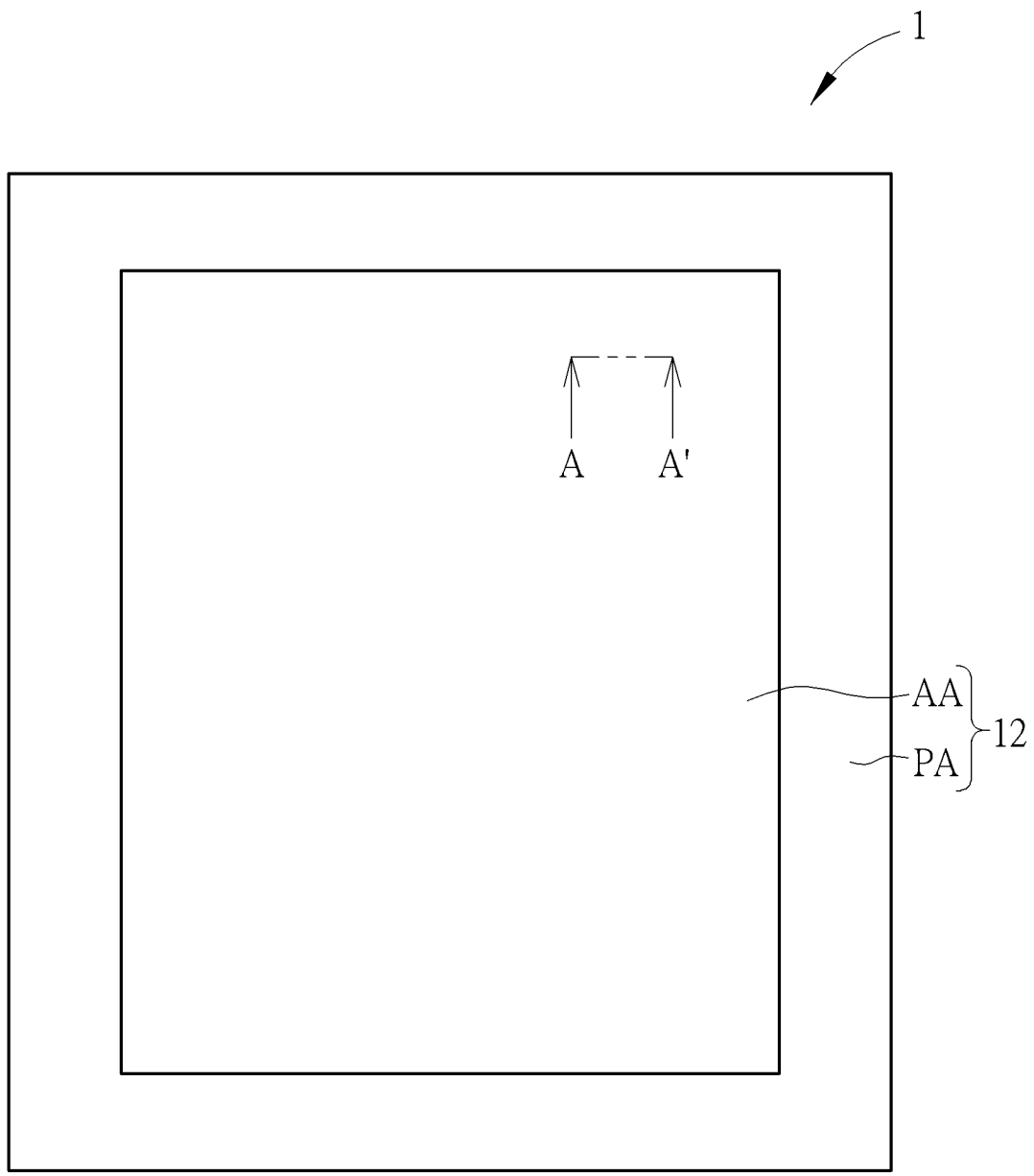
FIG. 1 schematically illustrates a top view of an electronic device according to an embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following specification and claims, the terms "comprise", "include" and "have" are open-ended fashion, so they should be interpreted as "including but not limited to . . . ".

The ordinal numbers used in the specification and the appended claims, such as "first", "second", etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name. The claims and the description may not use the same terms. Accordingly, a first element in the description may be a second element in the claims.

Spatially relative terms, such as "above", "on", "beneath", "below", "under", "left", "right", "before", "front", "after", "behind" and the like, used in the following embodiments just refer to the directions in the drawings and are not intended to limit the present disclosure.

In addition, when one element or layer is "on" or "above" another element or layer or is "connected to" the another element or layer, it may be understood that the element or layer is directly on the another element or layer or directly connected to the another element or layer, and alternatively, another element or layer may be between the element or layer and the another element or layer (indirectly). On the contrary, when the element or layer is "directly on" the another element or layer or is "directly connected to" the another element or layer, it may be understood that there is no intervening element or layer between the element or layer and the another element or layer. Also, the term "electrically connected" or "coupled" includes means of direct or indirect electrical connection.

As disclosed herein, the terms "approximately", "essentially", "about", or "substantially" generally mean within 20%, 10%, 5%, 3%, 2%, 1%, or 0.5% of the reported numerical value or range. The quantity disclosed herein is an approximate quantity, that is, without a specific description of "approximately", "essentially", "about", or "substantially", the quantity may still include the meaning of "approximately", "essentially", "about", or "substantially".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

In the present disclosure, the length, thickness, width, height, distance, and area may be measured by using an optical microscope (OM), a scanning electron microscope (SEM) or other approaches, but not limited thereto.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

An electronic device of the present disclosure may be a bendable, stretchable, foldable, rollable and/or flexible electronic device, but not limited thereto. In the present disclosure, the electronic device may include a light emitting device, a sensing device, a display device, an antenna device, a touch device, a tiled device or other suitable devices, but not limited thereto. The display device may, for example, be applied to a laptop, a public display, a tiled display, a vehicle display, a touch display, a television, a monitor, a smartphone, a tablet, a light source module, a lighting device or an electronic device applied to the above product, but not limited thereto. The sensing device may, for example, be a sensing device used for detecting change in capacitances, light, heat, or ultrasound, but not limited thereto. The sensing device may, for example, include a biosensor, a touch sensor, a fingerprint sensor, other suitable sensors or any combination of sensors mentioned above. The display device may, for example, include alight emitting element, a fluorescent material, a phosphor material, other suitable display mediums, or any combination thereof, but not limited thereto. The light emitting element may, for example, include an organic light emitting diode (OLED), a mini light emitting diode (mini LED), a micro light emitting diode (micro LED), a quantum dot light emitting diode (QDLED), other suitable elements or any combination of elements mentioned above. The antenna device may, for example, include liquid crystal antenna or antennas of other types, but not limited thereto. The tiled device may, for example, include a tiled display device or a tiled antenna device, but not limited thereto. Furthermore, the appearance of the electronic device may be rectangular, circular, polygonal, a shape with curved edges, curved or other suitable shapes, but not limited thereto. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but not limited thereto. The electronic device mentioned in the following contents and drawings is taken as an electronic device with a touch sensing function for an example to describe the present disclosure, but the present disclosure is not limited thereto.

Figure 2:
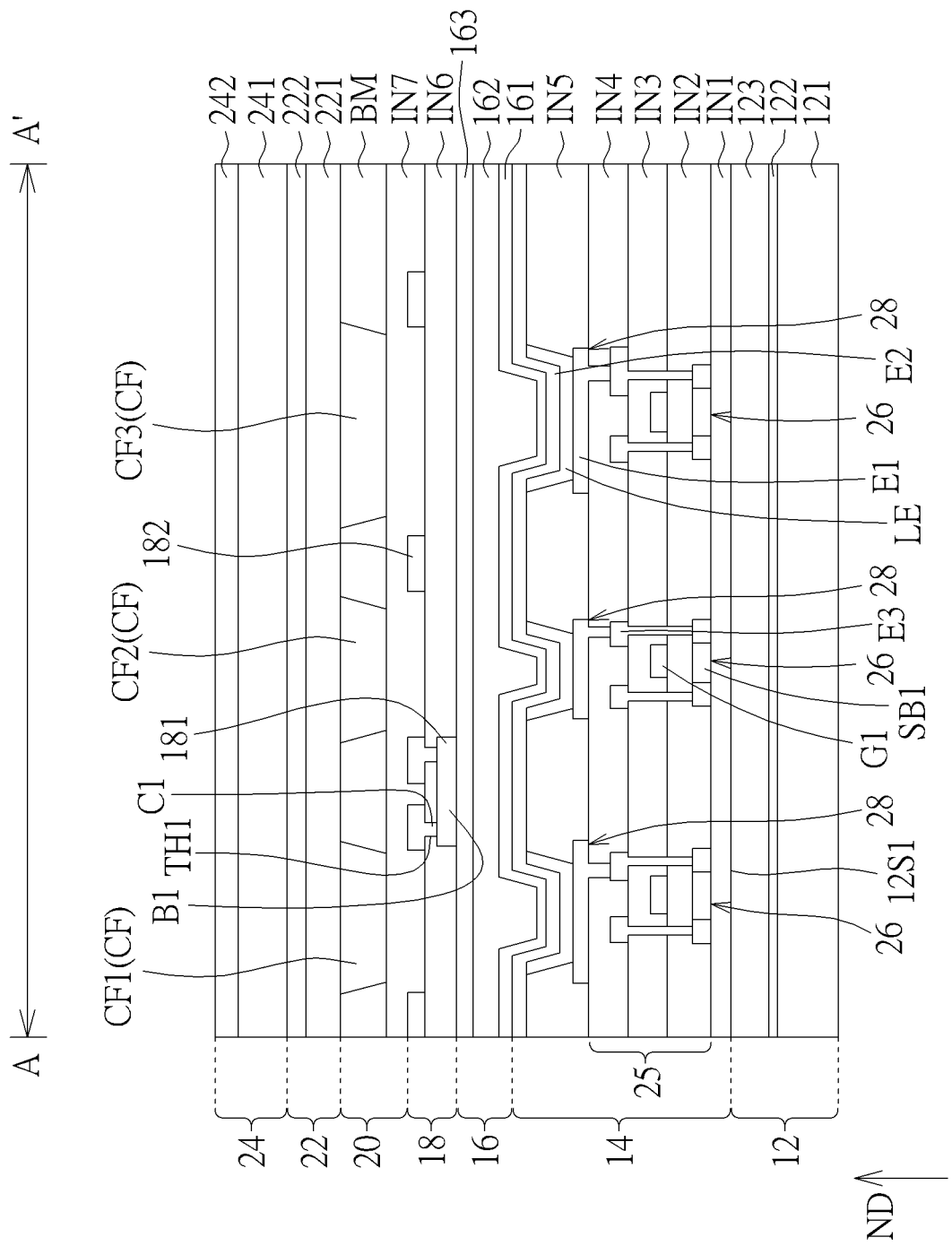
FIG. 2 schematically illustrates a cross-sectional view of FIG. 1 taken along a line A-A'.

Refer to FIG. 1 and FIG. 2. FIG. 1 schematically illustrates a top view of an electronic device according to an embodiment of the present disclosure, and FIG. 2 schematically illustrates a cross-sectional view of FIG. 1 taken along a line A-A'. As shown in FIG. 1 and FIG. 2, the electronic device 1 may include a substrate 12 and a sensing structure 18. The sensing structure 18 is disposed on the substrate 12 and includes a first conductive layer 181, a second conductive layer 182 and an insulating layer IN6. The second conductive layer 182 is disposed on the first conductive layer 181, and the insulating layer IN6 is disposed between the first conductive layer 181 and the second conductive layer 182. In the present disclosure, the top view/top view angle of the electronic device 1 or elements thereof may be, for example, viewing the electronic device 1 along a direction opposite to a normal direction ND perpendicular to a surface 12S1 of the substrate 12. The bottom view/bottom view angle of the electronic device 1 or elements thereof may be, for example, viewing the electronic device 1 along the normal direction ND perpendicular to the surface 12S1 of the substrate 12.

Figure 3:
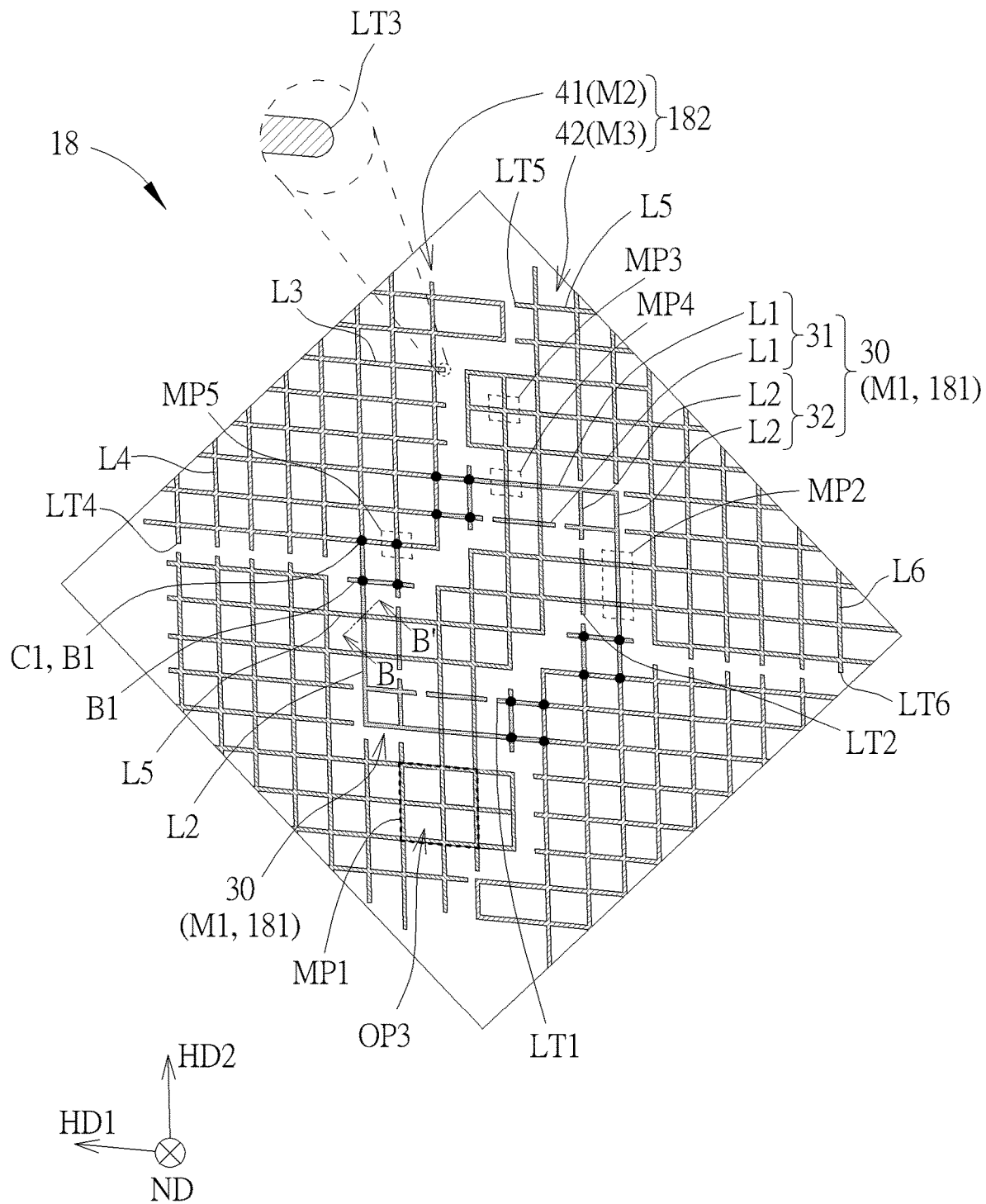
FIG. 3 schematically illustrates a partial bottom view of a sensing structure according to an embodiment of the present disclosure.

Please refer to FIG. 3 simultaneously, which schematically illustrates a partial bottom view of a sensing structure according to an embodiment of the present disclosure. As shown in FIG. 3, the sensing structure 18 may include a first conductive layer 181 and a second conductive layer 182. The sensing structure 18 may include a plurality of the portions shown in FIG. 3 connected with each other. As shown in FIG. 3, the first conductive layer 181 may include a plurality of connection units 30. Herein, the number of the connection units 30 is two. One of the connection units 30 may include a plurality of segments L1 parallel to the direction HD1 and a plurality of segments L2 parallel to the direction HD2. The direction HD1 and the direction HD2 may perpendicular to the normal direction ND, and may not be parallel to each other. In the embodiment, the direction HD1 is not perpendicular to the direction HD2, and the included angle between the direction HD1 and the direction HD2 is less than 90 degrees, but not limited thereto. The segments L1 and the segments L2 may form a mesh M1, wherein a plurality of segments L1 may form a first strip portion 31, and a plurality of segments L2 may form a second strip portion 32. The first strip portion 31 and the second strip portion 32 may be connected to each other, so that the shape of the connection unit 30 may be substantially V-shaped in the top view/bottom view.

The second conductive layer 182 may include a plurality of sensing units 41 and a plurality of sensing units 42. The sensing units 41 and the sensing units 42 may be configured to sense an input of a touch object. The touch object may include, for example, a finger, an active stylus, a laser pen or other suitable object. In FIG. 3, two sensing units 41 and two sensing units 42 are shown. The sensing unit 41 may include a plurality of segments L3 parallel to the direction HD1 and a plurality of segments L4 parallel to the direction HD2, and the segments L3 and the segments L4 may form a mesh M2. The sensing unit 42 may include a plurality of segments L5 parallel to the direction HD1 and a plurality of segments L6 parallel to the direction HD2, and the segments L5 and the segments L6 may form a mesh M3. In addition, as mentioned above, the sensing structure 18 may include the plurality of the portions shown in FIG. 3 connected with each other. FIG. 3 only shows a portion of the sensing units 41 and a portion of the sensing units 42, and the shape of one of the sensing unit 41 may be substantially a parallelogram or a rhombus. That is, the segments L3 and the segments L4 may extend outwardly, so that the mesh M2 is substantially a parallelogram or a rhombus. Similarly, the shape of one of the sensing unit 42 may be substantially a parallelogram or a rhombus. That is, the segments L5 and the segments L6 may extend outwardly, so that the mesh M3 is substantially a parallelogram or a rhombus.

In the present disclosure, the term "segment" (such as the aforementioned segment L1, segment L2, segment L3, segment L4, segment L5 and segment L6) may be defined as a segment extending along a same direction. Different segments may be parallel to each other or cross each other.

The sensing units 41 and the sensing units 42 may be disposed on a same plane (the upper surface of the insulating layer IN6 shown in FIG. 2), and the connection units 30 may be disposed on another plane (the upper surface of the inorganic layer 163 shown in FIG. 2). The plane on which the sensing units 41 and the sensing units 42 are disposed may be located above the plane on which the connection units 30 are disposed. In FIG. 3, the sensing unit 41, the sensing unit 42 and the connection unit 30 are presented by different ground patterns, which is for enhancing the recognition and does not have other meanings.

Figure 4:
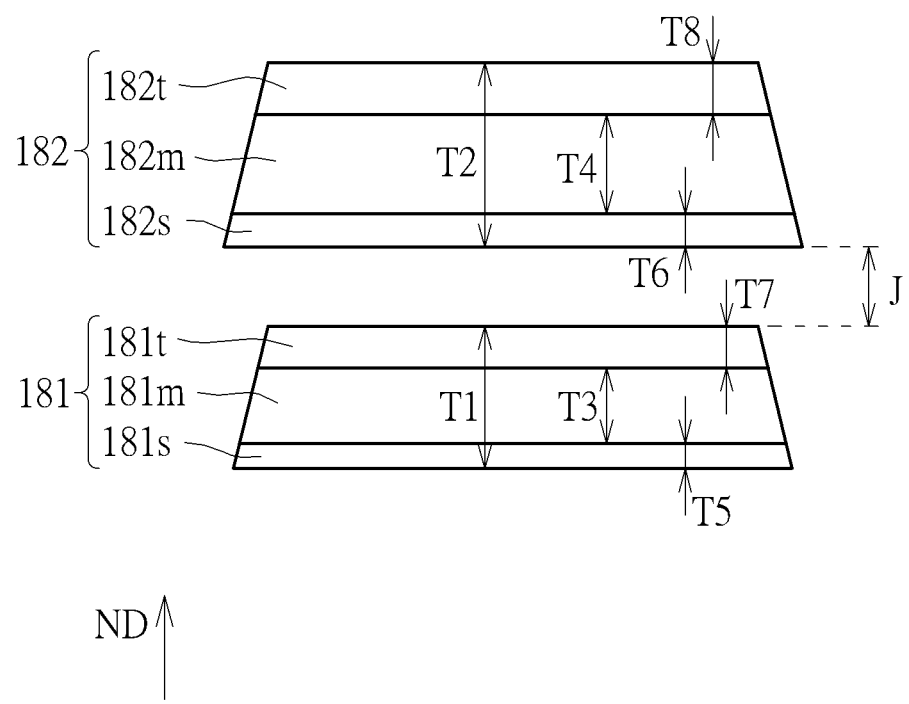
FIG. 4 schematically illustrates a cross-sectional view of FIG. 3 taken along a line B-B'.
Figure 9:
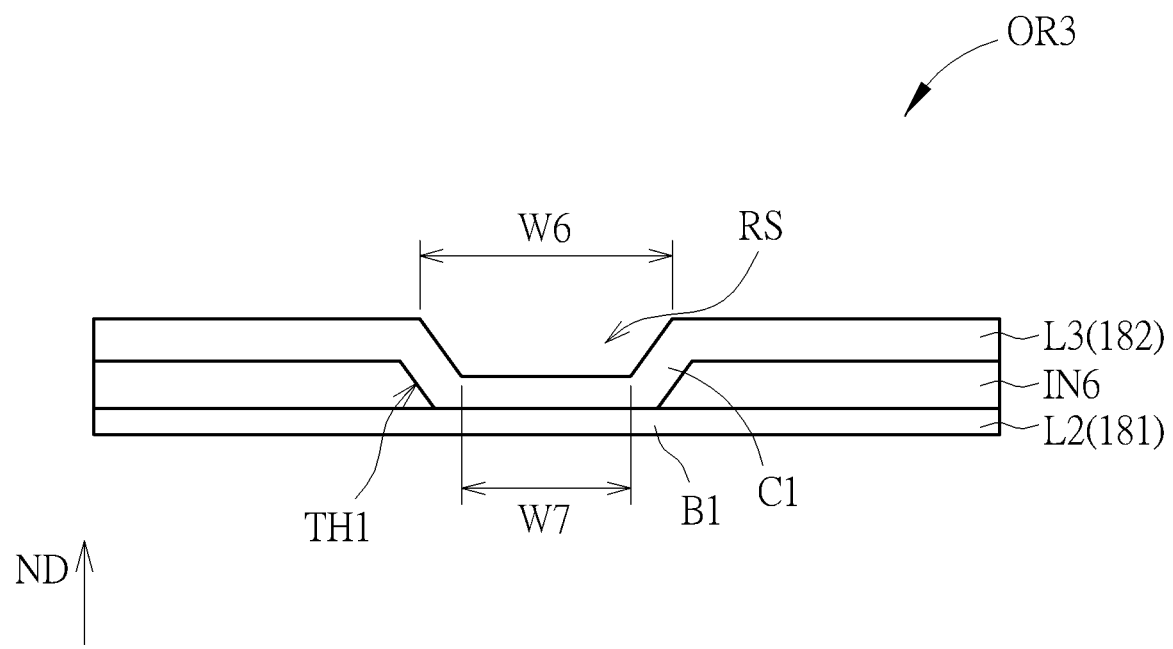
FIG. 9 schematically illustrates a cross-sectional view of FIG. 8 taken along a line C-C'.

Please refer to FIG. 4 simultaneously, which schematically illustrates a cross-sectional view of FIG. 3 taken along a line B-B'. As shown in FIG. 3 and FIG. 4, the second conductive layer 182 may be at least partially overlapped with the first conductive layer 181. For example, the segment L1 and the segment L2 of the connection unit 30 may partially overlap the segment L5 and the segment L6 of the sensing unit 42. More specifically, in the cross-sectional view taken along the line B-B', the segment L5 crosses the segment L2 while the segment L5 and th segment L2 may have a separation distance J in the normal direction ND and are not connected with each other. As shown in FIG. 4, a thickness T2 of the second conductive layer 182 is greater than a thickness T1 of the first conductive layer 181. That is, the following condition is satisfied: T2>T1. When the second conductive layer 182 is required to be electrically connected to the first conductive layer 181 through the via TH1 (as shown in FIG. 9), the via TH1 is formed in the corresponding position of the insulating layer IN6 first, and then the second conductive layer 182 with a uniform thickness is formed on the insulating layer IN6. As a result, the second conductive layer 182 forms a step difference at the via TH1. With the first conductive layer 181 having a thinner thickness T1, it is beneficial to reduce the step difference of the second conductive layer 182, and the uniformity of the overall thickness of the sensing structure 18 can be improved. In some embodiments, a ratio of the thickness T1 of the first conductive layer 181 to the thickness T2 of the second conductive layer 182 may be greater than or equal to 0.1 and less than 1. That is, the following condition may be satisfied: 0.1≤T1/T2<1. Alternatively, the following condition may be satisfied: 0.5≤T1/T2<1. When the ratio of the thickness T1 of the first conductive layer 181 to the thickness T2 of the second conductive layer 182 is greater than 1, the thickness T1 of the first conductive layer 181 may be excessively large, and portion of the second conductive layer 182 at the via TH1 may be break due to excessive bending. When the ratio of the thickness T1 of the first conductive layer 181 to the thickness T2 of the second conductive layer 182 is less than 0.1, the impedance at the position where the first conductive layer 181 electrically connected to the second conductive layer 182 may be excessively high, resulting in abnormal electrical connection.

The first conductive layer 181 and/or the second conductive layer 182 may include at least one conductive material layer, respectively. As shown in FIG. 4, the first conductive layer 181 may, for example, include a first top layer 181t, a first bottom layer 181s and a first middle layer 181m, and the first middle layer 181m is disposed between the first top layer 181t and the first bottom layer 181s. The second conductive layer 182 may include a second top layer 182t, a second bottom layer 182s and a second middle layer 182m, and the second middle layer 182m is disposed between the second top layer 181t and the second bottom layer 182s. A thickness T4 of the second middle layer 182m may be greater than a thickness T3 of the first middle layer 181m. That is, the following condition may be satisfied: T4>T3.

In some embodiments, a difference between the thickness T4 of the second middle layer 182m and the thickness T3 of the first middle layer 181m is greater than a difference between a thickness T6 of the second bottom layer 182s and a thickness T5 of the first bottom layer 181s. That is, the following condition may be satisfied: (T4−T3)>(T6−T5).

In some embodiments, a thickness T7 of the first top layer 181t may be greater than the thickness T5 of the first bottom layer 181s. That is, the following condition may be satisfied: T7>T5. In some embodiments, a thickness T8 of the second top layer 182t may be greater than the thickness T6 of the second bottom layer 182s. That is, the following condition may be satisfied: T8>T6.

The aforementioned relationship between any two thicknesses, such as the thickness T1 and the thickness T2, or the thickness T3 and the thickness T4, or the thickness T5 and the thickness T6, or the difference between the thickness T4 and the thickness T3 and the difference between the thickness T6 and the thickness T5, or the thickness T7 and the thickness T5, or the thickness T8 and the thickness T6, may be compared at the same position in the cross-sectional view of the portion wherein the first conductive layer 181 overlaps the second conductive layer 182. In addition, the aforementioned position should avoid edge regions where the thickness is varied, and avoid regions where the first conductive layer 181 and the second conductive layer 182 are connected with each other through the via TH1 (see FIG. 2), such as the second overlapping region OR3 or the connection portion C1 recited below.

The material of the first conductive layer 181 and/or the second conductive layer 182 may, for example, include metal, metal oxide or any suitable conductive material. For example, materials with better conductivity may be chosen as the materials of the first middle layer 181m and the second middle layer 182m, such as aluminum (Al), copper (Cu), etc. Materials with lower contact resistance when connecting to other metals may be chosen as the materials of the first top layer 181t, the first bottom layer 181s, the second top layer 182t and the second bottom layer 182s, such as molybdenum (Mo), titanium (Ti), etc. In some embodiments, the material combination of the first top layer 181t, the first middle layer 181m and the first bottom layer 181s may be Ti/Al/Ti, or may be Mo/Al/Mo, or may be Ti/Cu/Ti, but not limited thereto. The material combination of the second top layer 182t, the second middle layer 182m and the second bottom layer 182s may be Ti/Al/Ti, or may be Mo/Al/Mo, or may be Ti/Cu/Ti, but not limited thereto.

The insulating layer IN6 may include a plurality of vias TH1 (see FIG. 2), so that two sensing units 41 located above the insulating layer IN6 electrically connect to one of the connection units 30 through at least two vias TH1 in the insulating layer IN6. Specifically, in FIG. 3, the segment L1 and the segment L2 of the connection unit 30 may include a bridge portion B1 corresponding to the via TH1. Herein, each of the connection units 30 includes eight bridge portions B1, wherein four bridge portions B1 are disposed at one end of the first strip portion 31 adjacent to the sensing unit 41, and the other four bridge portions B1 are disposed at one end of the second strip portion 32 adjacent to the sensing unit 41. The segment L3 and the segment L4 of the sensing unit 41 may include a connection portion C1 corresponding to the via TH1. Herein, each of the sensing units 41 includes at least four connection portions C1, wherein the connection portion C1, the via TH1 and the bridge portion B1 overlap in the top view/bottom view. In other words, at least one of the segments L3 and the segments L4 may have a connection portion C1, the connection portion C1 may connect to one of the segments L1 and the segments L2 through one of the vias TH1. Moreover, the connection portions C1 of two sensing units 41 may be respectively connected to the bridge portions B1 of the connection units 30, so that the two sensing units 41 may be electrically connected to each other. The term "overlap" mentioned above and below may refer to overlap in the normal direction ND of the surface 12S1 of the substrate 12.

In FIG. 3, at least one end LT3 of the segment L3 is curved. Thereby, it is beneficial to reduce the tip discharge caused by the charge accumulation at the tip. Similarly, at least one end LT1 of the segment L1, at least one end LT2 of the segment L2, at least one end LT4 of the segment L4, at least one end LT5 of the segment L5 and at least one end LT6 of the segment L6 may also be curved.

In FIG. 3, the mesh M3 may include a plurality of openings OP3, such as the four openings OP3 labeled in the portion MP1. The openings OP3 may correspond to the electronic units 28 (see FIG. 2). For example, the electronic unit 28 may be disposed in a corresponding opening OP3, but not limited thereto. The shape of each of the four openings OP3 in portion MP1 is a rhombus, and the areas of the four openings OP3 may be the same or different, but not limited thereto. In some embodiments, the shape of opening OP3 may be adjusted according to actual requirement, for example, may be a triangle, a rectangle or other suitable shapes.

Figure 5:
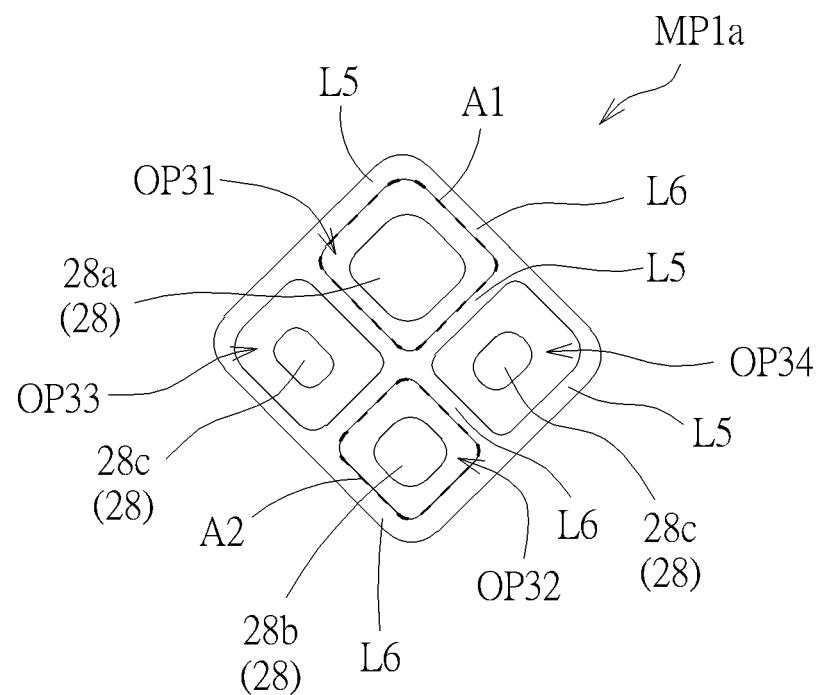
FIG. 5 schematically illustrates a top view of a portion of a mesh and corresponding electronic units according to another embodiment of the present disclosure.
Figure 5:
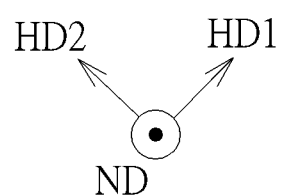

Please refer to FIG. 5, which schematically illustrates a top view of a portion of a mesh and corresponding electronic units according to another embodiment of the present disclosure. The position of the portion MP1a in FIG. 5 corresponds to the position of the portion MP1 in FIG. 3, but is in the top view. The portion MP1a includes an opening OP31, an opening OP32, an opening OP33 and an opening OP34. The sizes of the opening OP33 and the opening OP34 are the same. The sizes of the opening OP31, the opening OP32 and the opening OP33 are different, wherein the size of the opening OP31 is the largest, the size of the opening OP32 is the smallest, and the sizes of the opening OP33 and the opening OP34 are between the sizes of the opening OP31 and the opening OP32. That is, the area A1 of the opening OP31 and the area A2 of the opening OP32 may satisfy the following condition: A1>A2. In some embodiments, a ratio of the area A1 of the opening OP31 to the area A2 of the opening OP32 may be greater than 1 and less than or equal to 9. That is, the following condition may be satisfied: 1<A1/A2≤9. In some embodiments, the ratio of the area A1 of the opening OP31 to the area A2 of the opening OP32 may be greater than 1 and less than or equal to 25. That is, the following condition may be satisfied: 1<A1/A2≤25.

Specifically, the portion MP1a may surround the electronic unit 28a, the electronic unit 28b and the electronic unit 28c that generate lights of different colors. For example, the electronic unit 28a may be used to generate blue light, the electronic unit 28b may be used to generate red light, and the electronic unit 28c may be used to generate green light, so as to respectively correspond to the three primary colors of red, green and blue, but not limited thereto. In some embodiments, the light emitting areas of the electronic units 28 may be different from each other. For example, the light emitting area of the electronic unit 28a may be greater than the light emitting area of the electronic unit 28b, and the light emitting area of the electronic unit 28b may be greater than the light emitting area of the electronic unit 28c. In other words, the opening OP31, the opening OP32 and the opening OP33 with different sizes may correspond to the electronic unit 28a, the electronic unit 28b and the electronic unit 28c with different light emitting areas, but not limited thereto. In some embodiments, the top view shape of one of the electronic units 28 may be, for example, a rectangle or other geometric shapes. In some embodiments, in the electronic units 28 surrounded by the portion MP1a, the number of the electronic units 28 for generating light of one color may be different from the number of the electronic units 28 for generating light of another color. For example, the number of the electronic units 28c may be greater than the number of the electronic units 28a and/or the number of the electronic units 28b. Also, as an example, one electronic unit 28a may correspond to two electronic units 28c and one electronic unit 28b, but not limited thereto. In some embodiments, the two electronic units 28c may generate light of different colors. For example, the colors of the lights generated by the electronic unit 28a, the electronic unit 28b and the two electronic units 28c may be a combination of red, green, blue and white (RGBW). In some embodiments, the electronic unit 28a, the electronic unit 28b and the electronic unit 28c surrounded by the portion MP1a may also generate lights of the same color, but not limited thereto.

Figure 6:
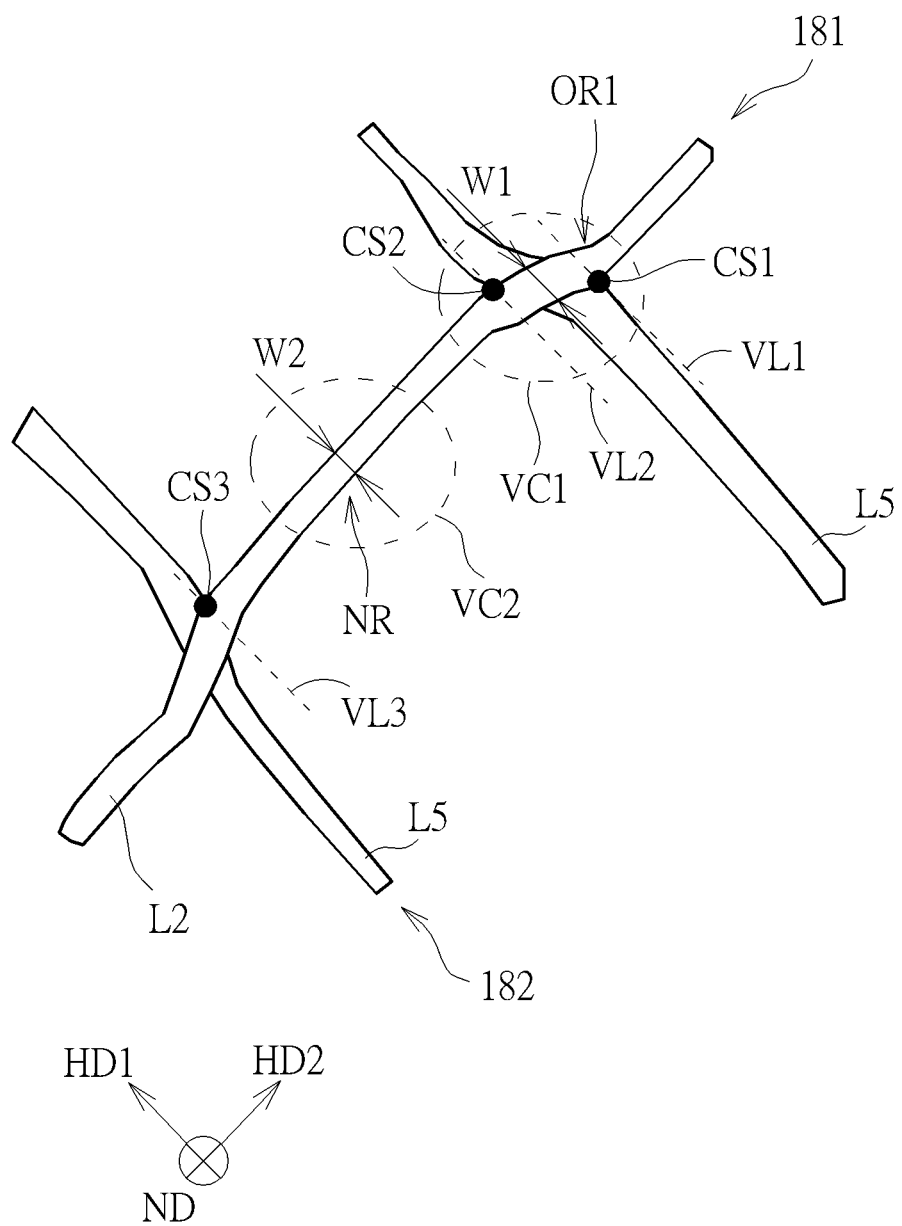
FIG. 6 schematically illustrates a partially enlarged view of the sensing structure shown in FIG. 3.

Please refer to FIG. 6, which schematically illustrates a partially enlarged view of the sensing structure shown in FIG. 3, which corresponding to the portion MP2 shown in FIG. 3. As shown in FIG. 6, the first conductive layer 181 has a first overlapping region OR1 (such as located in the virtual circle VC1) and a non-overlapping region NR (such as located in the virtual circle VC2). In the first overlapping region OR1, the segment L2 crosses and overlaps the segment L5. In the non-overlapping region NR, the segment L2 does not overlap the segment L5. A first width of the first overlapping region OR1 may be greater than a width W2 of the non-overlapping region NR. That is, the following condition may be satisfied: W1>W2. Thereby, excessively high charge density in the first overlapping region OR1 can be avoided, so that the risk of electrostatic discharge can be reduced. Alternatively, the following condition may be satisfied: 1<W1/W2≤3. Thereby, the risk of electrostatic discharge can be reduced, and the visual unevenness can be avoided, too. Alternatively, the following condition may be satisfied: 1<W1/W2≤2. Specifically, the measuring direction of the first width W1 of the first overlapping region OR1 and the width W2 of the non-overlapping region NR is perpendicular to the extending direction of the segment L2. For example, the extending direction of the segment L2 is the direction HD2, and the measuring direction is perpendicular to the direction HD2. The measuring position of the first width W1 of the first overlapping region OR1 is as follows. A virtual segment VL1 and a virtual segment VL2 are respectively defined by an intersection point CS1 and an intersection point CS2 of the segment L2 and two sides of the segment L5, and the measuring position is the position equidistant from the virtual segment VL1 and the virtual segment VL2, i.e., the middle position of the portion of the segment L2 between the virtual segment VL1 and the virtual segment VL2. The measuring position of the width W2 of the non-overlapping region NR is the middle position of the portion of the segment L2 between two segments L5. More specifically, the intersection point CS2 and the intersection point CS3 of the segment L2 and two segments L5 at two sides of the segment L2 respectively define a virtual segment VL2 and a virtual segment VL3, and the measuring position is the middle position of the portion of the segment L2 between the virtual segment VL2 and the virtual segment VL3. It should be noted that the virtual segment VL1, the virtual segment VL2 and the virtual segment VL3 are parallel to the direction perpendicular to the direction HD2.

Figure 7:
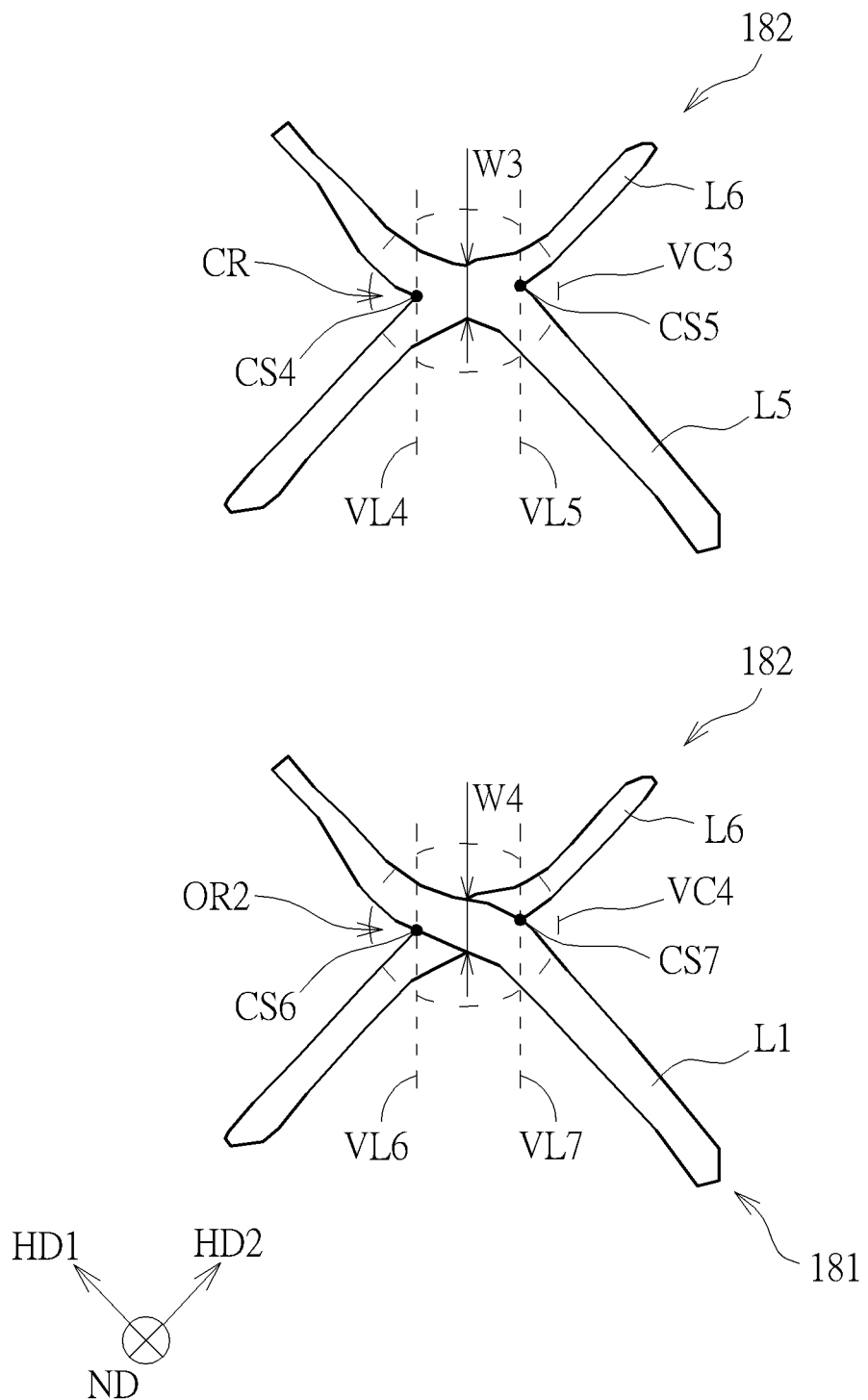
FIG. 7 schematically illustrates another partially enlarged view of the sensing structure shown in FIG. 3.

Please refer to FIG. 7, which schematically illustrates another partially enlarged view of the sensing structure shown in FIG. 3, which corresponds to the portion MP3 and the portion MP4 shown in FIG. 3. As shown in the upper portion of FIG. 7 (corresponding to the portion MP3 shown in FIG. 3), the second conductive layer 182 has a connection region CR (such as located in the virtual circle VC3). In the connection region CR, the segment L5 and the segment L6 are connected with each other, and the connection region CR has a width W3. As shown in the lower portion of FIG. 7 (corresponding to the portion MP4 shown in FIG. 3), the first conductive layer 181 has a first overlapping region OR2 (such as located in the virtual circle VC4). In the first overlapping region OR2, the segment L1 crosses and overlaps the segment L6, and the first overlapping region OR2 has a second width W4. The second width W4 of the first overlapping region OR2 may be smaller than the width W3 of the connection region CR. That is, the following condition may be satisfied: W4<W3. Thereby, the parasitic capacitance between the first conductive layer 181 and the second conductive layer 182 in the first overlapping region OR2 can be reduced, which is beneficial to enhance the signal-to-noise ratio (SNR) of the sensing structure 18. Alternatively, the following condition may be satisfied: 1<W3/W4≤3. Alternatively, the following condition may be satisfied: 1<W3/W4≤2. The measuring method of the width W3 of the connection region CR is as follows. The segment L5 and the segment L6 can define two intersection points CS4 and CS5 with a larger spaced distance therebetween, and the width W3 is measured at the middle position between the two intersection points CS4 and CS5. More specifically, the two intersection points CS4 and CS5 of the segment L5 and the segment L6 with a larger spaced distance therebetween respectively define a virtual segment VL4 and a virtual segment VL5, and the measuring position of width W3 is the middle position between the virtual segment VL4 and the virtual segment VL5. The measuring method of the second width W4 of the first overlapping region OR2 is as follows. The segment L1 and the segment L6 may define two intersection points CS6 and CS7 with a larger distanced therebetween, and the second width W4 is measured at the middle position between the two intersection points CS6 and CS7. More specifically, the two intersection points CS6 and CS7 of the segment L1 and the segment L6 respectively define a virtual segment VL6 and a virtual segment VL7, and the second width W4 is measured at the middle position between the virtual segment VL6 and the virtual segment VL7. When comparing the width W3 and the second width W4, the comparison is based on the measuring results obtained in the same measuring direction.

Figure 8:
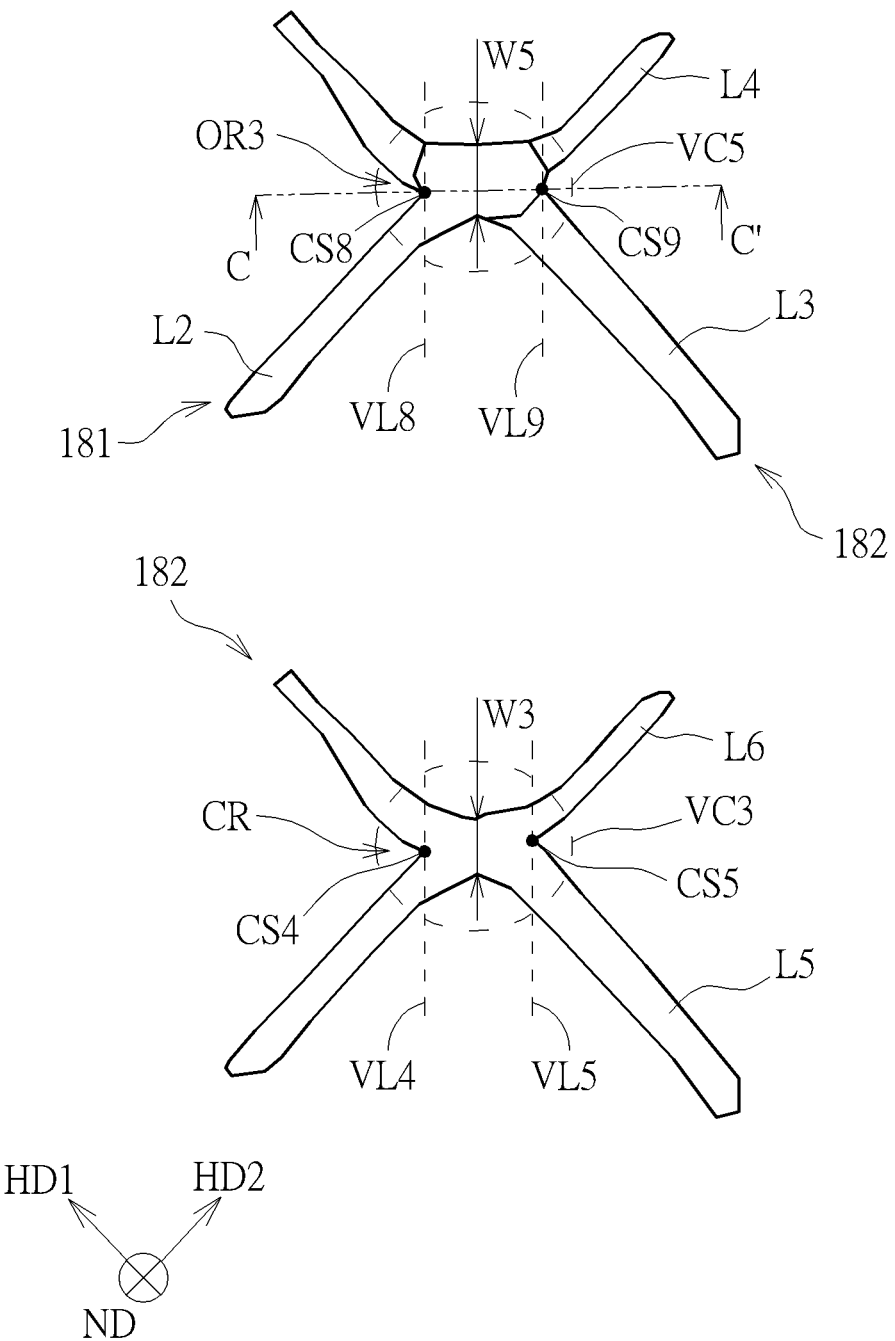
FIG. 8 schematically illustrates yet another partially enlarged view of the sensing structure shown in FIG. 3.

Please refer to FIG. 8, which schematically illustrates yet another partially enlarged view of the sensing structure shown in FIG. 3. As shown in the upper portion of FIG. 8 (corresponding to the portion MP5 shown in FIG. 3), the first conductive layer 181 has a second overlapping region OR3 (such as located in the virtual circle VC5). In the second overlapping region OR3, the segment L2 connects and overlaps the segment L3, and the second overlapping region OR3 has a width W5. As shown in the lower portion of FIG. 8 (corresponding to the portion MP3 shown in FIG. 3), the second conductive layer 182 has a connection region CR (such as located in the virtual circle VC3). In the connection region CR, the segment L5 and the segment L6 are connected with each other, and the connection region CR has a width W3. The width W5 of the second overlapping region OR3 may be larger than the width W3 of the connection region CR. That is, the following condition may be satisfied: W3<W5. Thereby, it is beneficial to reduce the impedance between the first conductive layer 181 and the second conductive layer 182 in the second overlapping region OR3 and enhance the signal-to-noise ratio of the sensing structure 18. Alternatively, the following condition may be satisfied: 1<W5/W3≤5. Alternatively, the following condition may be satisfied: 1<W5/W3≤3. The measuring method of the width W5 of the second overlapping region OR3 is as follows. The segment L2 and the segment L3 may define two intersection points CS8 and CS9 with a larger spaced distance therebetween, and the width W5 is measured at the middle position between the two intersection points CS8 and CS9. More specifically, the two intersection points CS8 and CS9 of the segment L2 and the segment L3 with a larger spaced distance therebetween respectively define a virtual segment VL8 and a virtual segment VL9, and the width W5 is measured at the middle position between the virtual segment VL8 and the virtual segment VL9. For measuring method of the width W3, reference may be made to the above description. When comparing the width W3 and the width W5, the comparison is based on the measuring results obtained in the same measuring direction.

In the present disclosure, the main difference between the first overlapping region OR1, the first overlapping region OR2 and the second overlapping region OR3 is the second overlapping region OR3 corresponding to the position of the via TH1. Thereby, in the second overlapping region OR3, the first conductive layer 181 and the second conductive layer 182 can be electrically connected with each other through the via TH1. In addition, the first overlapping region OR1 and the first overlapping region OR2 are the regions where one of the segments (such as the segment L1 and the segment L2 shown in FIG. 3) of the first conductive layer 181 cross and overlap one of the segments of the second conductive layer 182 (such as the segment L5 and the segment L6 shown in FIG. 3).

Please refer to FIG. 9, which schematically illustrates a cross-sectional view of FIG. 8 taken along a line C-C'. As shown in FIG. 9, the segment L3 may have a connection portion C1, and the connection portion C1 may connect to the segment L2 through the via TH1. Specifically, the connection portion C1 may connect to the bridge portion B1 of the segment L2 through the via TH1. The connection portion C1 may form a recess RS, and a ratio of the top width W6 of the recess RS to the bottom width W7 of the recess RS may be greater than 1 and less than or equal to 2.5. That is, the following condition may be satisfied: $1<W6/W7\leq2.5$. Alternatively, the following condition may be satisfied: $1<W6/W7\leq1.5$. The aforementioned top width W6 is the width of the opening at the top of recess RS in the cross-section view, and the aforementioned bottom width W7 is the width of the bottom surface of the recess RS in the cross-section view.

Please refer back to FIG. 2. In some embodiments, the substrate 12 may be a rigid substrate or a flexible substrate. A material of the rigid substrate may include, for example, glass, ceramics, sapphire or other suitable substrate materials. A material of the flexible substrate may include, for example, plastic or other suitable substrate materials. The plastic may include, for example, polyimide (PI), polycarbonate (PC), polyethylene terephthalate (PET), polymethyl methacrylate (PMMA) or other suitable substrate materials. In some embodiments, the substrate 12 may be a single-layer or multilayer structure. As shown in FIG. 2, when the substrate 12 is a multilayer structure, the substrate 12 may be a composite layer, which may include, for example, an organic layer 121, an inorganic layer 122 and an organic layer 123 stacked in sequence from bottom to top. The organic layer 121 and/or the organic layer 123 may include, for example, polyimide (PI) or other suitable materials. The inorganic layer 122 may include, for example, silicon oxide ($SiO_x$), silicon nitride ($SiN_x$), silicon oxynitride ($SiO_xN_y$) or other suitable materials. It should be noted that, as shown in FIG. 1, the substrate 12 may have an active region AA and a non-active region PA. The active region AA may be configured to dispose at least one sensing unit (e.g., the sensing unit 41 and the sensing unit 42 shown in FIG. 3) and/or at least one electronic unit (e.g., the electronic unit 28 shown in FIG. 2). The active region AA may, for example, be defined by a region of a sensor formed by a plurality of sensing units or a display region where the electronic device 1 displays images. The non-active region PA may be, for example, a region where the electronic device 1 cannot sense the touch object and/or a peripheral region where the electronic device 1 does not display images, but the active region AA of the present disclosure is not limited thereto.

The insulating layer IN6 may include, for example, an organic material or an inorganic material. The organic material may include, for example, acrylic, epoxy, resin or other suitable materials. The inorganic material may include, for example, silicon oxide ($SiO_x$), silicon nitride ($SiN_x$), silicon oxynitride ($SiO_xN_y$) or other suitable materials.

In some embodiments, the electronic device 1 may further include a circuit layer 14. The circuit layer 14 may be, for example, a layer including at least one active element or at least one passive element. For example, the circuit layer 14 may include an electronic unit 28 and a pixel circuit 25 configured to control the electronic unit 28. The number of the electronic unit 28 in the circuit layer 14 may be, for example, one or more and may be adjusted according to requirements. The following description takes the circuit layer 14 including a plurality of electronic units 28 as an example, but not limited thereto. Herein, the pixel circuit 25 "controlling" the electronic units 28 may refer that the pixel circuit 25 is able to receive external signals and drive the electronic units 28 according to the external signals, such that the electronic units 28 generate corresponding outputs, such as emitting light or emitting radio frequency electromagnetic waves.

In the embodiment of FIG. 2, the electronic units 28 may be light emitting elements, but not limited thereto. The electronic units 28 may include diodes, such as organic light emitting diodes or inorganic light emitting diodes. In FIG. 2, the electronic units 28 are exemplary as the organic light emitting diodes, and each of the electronic units 28 may include an electrode E1, a light emitting layer LE and an electrode E2 stacked in sequence. In an embodiment, the electronic units 28 may include light emitting elements for generating lights of different colors, which may serve as sub-pixels of different colors, so that the electronic device 1 may display color images. The electronic units 28 may be configured to generate blue light, red light and green light respectively, but not limited thereto. In some embodiments, the electronic units 28 may generate lights of the same color, but not limited thereto. In some embodiments, the first conductive layer 181 and the second conductive layer 182 do not overlap the electronic unit 28. Thereby, the first conductive layer 181 and the second conductive layer 182 do not shield the electronic unit 28 in the top view.

As shown in FIG. 2, the pixel circuit 25 may include at least one switch 26 electrically connected to at least one of the electronic units 28 and used to switch on/off the at least one of the electronic units 28. In the embodiment of FIG. 2, the number of the switch 26 in the pixel circuit 25 is exemplary plural, and the switches 26 may be electrically connected to the electronic units 28 in a one-to-one correspondence, but not limited thereto. The number of the switches 26 corresponding to one of the electronic units 28 may be adjusted based on requirements. In some embodiments, the pixel circuit 25 may optionally further include other active elements, passive elements, wires or other suitable circuit elements and will not be detailed redundantly.

The switches 26 in the circuit layer 14 may include, for example, thin film transistors formed by thin film processes or metal oxide semiconductor field effect transistors (MOSFETs) formed by semiconductor processes.

A structure of the circuit layer 14 of this embodiment is further detailed below, but not limited thereto. In the embodiment of FIG. 2, the pixel circuit 25 may include, for example, a plurality of semiconductor blocks SB1, an insulating layer IN2, a plurality of gate electrodes G1, an insulating layer IN3, a plurality of electrodes E3 and an insulating layer IN4. The semiconductor blocks SB1 may be disposed on the substrate 12, and two end portions of one of the semiconductor blocks SB1 may be doped with dopant to respectively serve as a drain region and a source region of a transistor, and a portion of the semiconductor block SB1 between the two end portions may serve as a channel region of the transistor. The insulating layer IN2 may be disposed on the semiconductor block SB1 and may serve as a gate insulating layer of the transistor. The gate electrodes G1 are disposed on the insulating layer IN2. One of the gate electrodes G1, the insulating layer IN2 and one of the semiconductor blocks SB1 may form one of the transistors, but not limited thereto. The transistors formed herein may include, for example, the switches 26, but not limited thereto. The insulating layer IN3 may be disposed on the gate electrodes G1. The electrodes E3 may be disposed on the insulating layer IN3 and may be respectively disposed in the vias (not labeled) of the insulating layer IN2 and the insulating layer IN3, so that the electronic units 28 may be electrically connected to the corresponding switches 26 through the corresponding electrodes E3. The insulating layer IN4 may be disposed on the insulating layer IN3 and the electrodes E3. The insulating layer IN4 may be, for example, a planarization layer, such that an upper surface of the planarization layer may be a flat surface to facilitate the formation of the electronic units 28. For example, the insulating layer IN4 may include organic materials or other suitable materials. In some embodiments, the number of the conductive layers (such as the gate electrodes G1 and the electrodes E3) and the number of the insulating layers (such as the insulating layer IN2, the insulating layer IN3 and the insulating layer IN4) of the pixel circuit 25 are not limited to the aforementioned and may further include other conductive layers and insulating layers according to other requirements. In some embodiments, the pixel circuit 25 may optionally include signal wires (e.g., scan lines and/or data lines) or other conductive elements, but not limited thereto.

A material of the semiconductor blocks SB1 may include, for example, silicon or metal oxide, such as low temperature poly-silicon (LTPS), amorphous silicon (a-Si), indium gallium zinc oxide (IGZO) or other suitable semiconductors, but not limited thereto. In some embodiments, the semiconductor blocks SB1 of different transistors in the circuit layer 14 may include different materials. For example, the semiconductor block SB1 of one of the transistors may include LTPS, and the semiconductor block SB1 of another one of the transistors may include metal oxide, but not limited thereto. The insulating layer IN2, the insulating layer IN3 and/or other insulating layers of the pixel circuit 25 may include, for example, silicon oxide, silicon nitride, silicon oxynitride or other suitable inorganic materials. The gate electrodes G1, the electrodes E3 and/or other conductive layers of the pixel circuit 25 may include metal materials. The metal materials may include, for example, aluminum, molybdenum, copper, titanium, other suitable materials or a combination of at least two thereof, but not limited thereto.

As shown in FIG. 2, the circuit layer 14 may further include an insulating layer IN5. The insulating layer IN5 may be disposed on the insulating layer IN4 and the electrode E1. The insulating layer IN5 may have a plurality of openings (not labeled) respectively exposing the corresponding electrodes E1, and the light emitting layers LE of the electronic units 28 may be respectively disposed in the corresponding openings and separated from each other, such that each of the electronic units 28 may be disposed corresponding to one of the openings. Accordingly, the insulating layer IN5 may be, for example, a pixel defining layer. For example, the insulating layer IN5 may include an organic material or other suitable materials. The organic materials of the insulating layer IN4 and the organic material of the insulating layer IN5 may be any suitable organic material, for example, including acrylic, epoxy or resin, but not limited thereto. The electrodes E2 may be disposed on the insulating layer IN5 and the light emitting layers LE.

In some embodiments, the circuit layer 14 may further include an insulating layer IN1 disposed between the substrate 12 and the pixel circuit 25. The insulating layer IN1, for example, may serve as a buffer layer of the electronic device 1 to block moisture and/or oxygen from the outside, thereby reducing possibility of damage to elements in the electronic device 1 due to moisture and/or oxygen. In some embodiments, the insulating layer IN1 may be disposed between the pixel circuit 25 and the substrate 12, but not limited thereto.

In some embodiments, the structure of the circuit layer 14 is not limited to the aforementioned structure, and may be adjusted as required. It should be noted that the structure of the circuit layer 14 shown in FIG. 2 is exemplary, and the present disclosure is not limited thereto.

As shown in FIG. 2, the electronic device 1 may further include an encapsulation layer 16 disposed on the electronic units 28 of the circuit layer 14 and configured for blocking moisture and/or oxygen from the outside, thereby reducing the possibility of damage to the electronic units 28 and the pixel circuit 25 due to moisture and/or oxygen. The encapsulation layer 16 may include an inorganic layer 161, an organic layer 162, and an inorganic layer 163 stacked in sequence from bottom to top.

The sensing structure 18 may be formed on the encapsulation layer 16 instead of being formed on an extra substrate. Thereby, the overall thickness and weight of the electronic device 1 can be reduced. In addition, in the above structure, when the substrate 12 is, for example, a flexible substrate, the electronic device 1 may also be flexible, but not limited thereto.

As shown in FIG. 2, the electronic device 1 may further include a functional layer 20. The functional layer 20 may include an insulating layer IN7, a light shielding layer BM and a color filter layer CF. The insulating layer IN7 is disposed on the sensing structure 18. The insulating layer IN7 may include, for example, an organic material, such that the insulating layer IN7 may have a flat upper surface. The light shielding layer BM may include a light shielding material, such as a black matrix, but not limited thereto. The light shielding layer BM, for example, may have a plurality of openings (not labeled), and each opening corresponds to one of the electronic units 28 in the normal direction ND. In some embodiments, the color filter layer CF may include, for example, a color filter CF1, a color filter CF2 and a color filter CF3 of different colors, which may respectively correspond to the electronic units 28 of different colors in the normal direction ND, but not limited thereto.

In some embodiments, the electronic device 1 may optionally include an encapsulation layer 22 and/or a protection layer 24. The encapsulation layer 22 may be disposed on the functional layer 20, and the protection layer 24 may be disposed on the encapsulation layer 22, but not limited thereto. The encapsulation layer 22 may include, for example, an organic layer 221 and an inorganic layer 222 stacked in sequence from bottom to top. The organic layer 221 may include, for example, PI, PET, adhesive or other suitable materials. The inorganic layer 222 may include, for example, silicon oxide, silicon nitride or other suitable materials. In some embodiments, the encapsulation layer 22 may include an alternating stack of a plurality of organic layers 221 and a plurality of inorganic layers 222, but not limited thereto. The protection layer 24 may include, for example, an organic layer 241 and a hard coating layer 242 stacked in sequence from bottom to top. A material of the organic layer 241 may be, for example, the same as or similar to that of the organic layer 221, but not limited thereto. A material of the hard coating layer 242 may include, for example, polycarbonate (PC), acrylic or other suitable materials. In some embodiments, the protection layer 24 may optionally include an ultra-thin glass (UTG), but not limited thereto.

In some embodiments, the encapsulation layer 22 and/or the protection layer 24 may be a substrate, and the light shielding layer BM and the color filter layer CF may be formed on the substrate first and then be attached to the sensing structure 18 through an adhesive layer, but not limited thereto.

Figure 10:
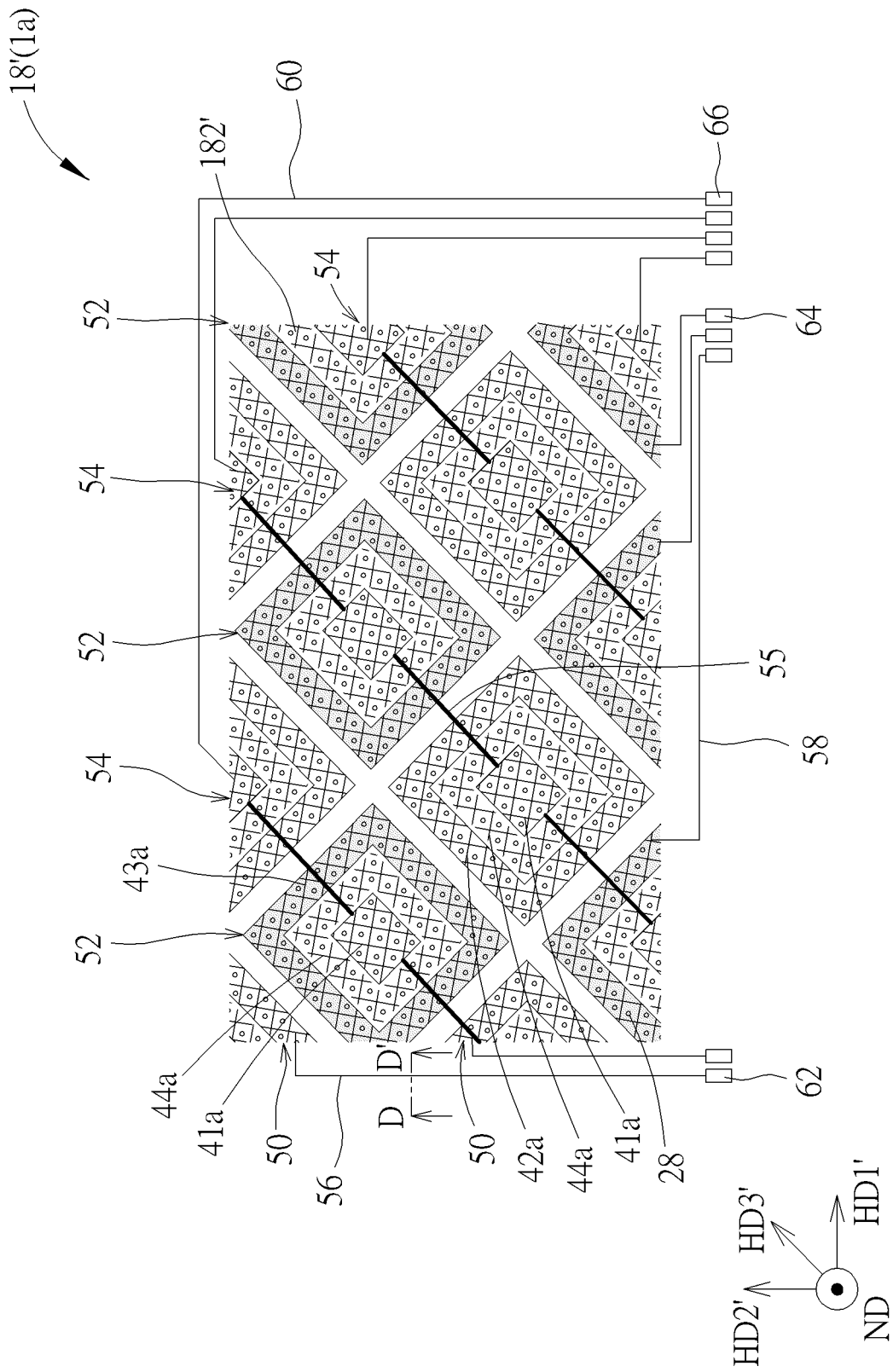
FIG. 10 schematically illustrates a top view of an electronic device according to another embodiment of the present disclosure.

Please refer to FIG. 10, which schematically illustrates a top view of an electronic device according to another embodiment of the present disclosure. In FIG. 10, the electronic device 1*a* includes a sensing structure 18'. The sensing structure 18' may include a second conductive layer 182'. The second conductive layer 182' may include a plurality of sensing units 41a, a plurality of sensing units 42a, a plurality of sensing units 43a and a plurality of dummy units 44a. The sensing units 43a are presented with different ground pattern, which is for enhancing the recognition and does not have other meanings. Each of the sensing units 42a may surround a corresponding sensing unit 41a, a dummy unit 44a is disposed between the sensing unit 42a and the sensing unit 41a, the dummy unit 44a surrounds the sensing unit 41a, and the sensing unit 42a surrounds the dummy unit 44a. Similarly, each of the sensing units 43a may surround a corresponding sensing unit 41a, a dummy unit 44a is disposed between the sensing unit 43a and the sensing unit 41a, the dummy unit 44a surrounds the sensing unit 41a, and the sensing unit 43a surrounds the dummy unit 44a. The sensing units 42a may be staggered with respect to the sensing units 43a along the direction HD3', and the sensing units 42a may be staggered with respect to the sensing units 43a along the direction perpendicular to the direction HD3'. The sensing unit 41a may have a rectangular shape in the top view, and may be a mesh formed by a plurality of segments (not labeled). The mesh may have a plurality of openings (not labeled) located between the segments, and the openings may correspond to the electronic units 28. The sensing unit 42a, the sensing unit 43a and the dummy unit 44a may be ring-shaped in the top view, and may be a mesh formed by a plurality of segments (not labeled). The mesh has a plurality of openings (not labeled) located between the segments, and the openings may correspond to electronic units 28. With the dummy unit 44a, the sensing unit 42a and the sensing unit 41a are separated from each other, so as to avoid signal interference between the sensing unit 42a and the sensing unit 41a. With the dummy unit 44a, the sensing unit 43a and the sensing unit 41a are separated from each other, so as to avoid signal interference between the sensing unit 43a and the sensing unit 41a. The direction HD1', the direction HD2' and the direction HD3' may be perpendicular to the normal direction ND, and may not be parallel to each other. In the embodiment, the direction HD1' may be perpendicular to the direction HD2', and the direction HD3' may not be perpendicular to the direction HD1' and the direction HD2'. In addition, the included angle between the direction HD3' and the direction HD1' may be less than 90 degrees, and the included angle between the direction HD3' and the direction HD2' may be less than 90 degrees, but not limited thereto.

The sensing units 42a may be connected by bridge electrodes (not shown) to form a plurality of first sensing strings 50. The first sensing string 50 may extend parallel to the direction HD1'. The sensing units 43a may be connected by bridge electrodes (not shown) to form a plurality of second sensing strings 52. The second sensing string 52 may extend parallel to the direction HD2', and the first sensing string 50 may cross the second sensing string 52 in the top view of the electronic device 1a. The sensing units 42a of the same first sensing string 50 may be electrically connected to each other, for example, through bridge electrodes, and connected to the pad 62 through the signal wire 56. The sensing units 43a of the same second sensing string 52 may be electrically connected to each other, for example, through bridge electrodes, and connected to the pad 64 through the signal wire 58. In FIG. 10, in order to clearly show the sensing structure 18', the aforementioned bridge electrodes are omitted, but the present disclosure is not limited thereto. The sensing units 41a may be connected by the bridge electrodes 55 to form a plurality of third sensing strings 54, wherein the third sensing string 54 may extend along the direction HD3'. The sensing units 41a of the same third sensing string 54 may be electrically connected to each other, for example, through bridge electrodes 55, and connect to the pad 66 through the signal wire 60.

The sensing unit 42a and the sensing unit 43a may be configured to sense the input by touch in a first sensing mode, and the sensing unit 41a may be configured to sense the input by an input device in a second sensing mode. The term "touch" mentioned herein may refer to a human body touching an upper surface of the electronic device 1a, such as touching the electronic device 1a with a finger or other suitable parts. The input device may include, for example, an active stylus, a laser pointer, or other suitable devices. Specifically, the pad 62 may be configured to transmit a driving signal of the first sensing mode, and the pad 64 may be configured to receive a sensing signal of the first sensing mode. In other words, the first sensing mode of the sensing structure 18' may be, for example, a mutual capacitive mode. The pad 66 may be configured to transmit a driving signal of the second sensing mode and to receive a sensing signal of the second sensing mode. For example, when the input device is an active stylus, the second pads 66 may transmit a driving signal to mutually induce with the active stylus, and then, may receive a sensing signal from the active stylus to determine the position of the active stylus. In other words, the second sensing mode of the sensing structure 18' may be, for example, a self-capacitive mode, but not limited thereto. In the embodiment, the sensing unit 42a and the sensing unit 43a are coplanar with the sensing unit 41a, and the sensing unit 42a and the sensing unit 43a do not overlap the sensing unit 41a. Therefore, the sensing unit 42a, the sensing unit 43a and the sensing unit 41a can independently perform the first sensing mode and the second sensing mode, so that the sensing structure 18' can perform the first sensing mode and the second sensing mode at the same time or at different times, but not limited thereto. In other embodiments, the top view layout pattern of the sensing structure 18' may be different from the top view layout pattern in FIG. 10, such that the plurality of sensing units may perform the first sensing mode and the second sensing mode at different times.

Figure 11:
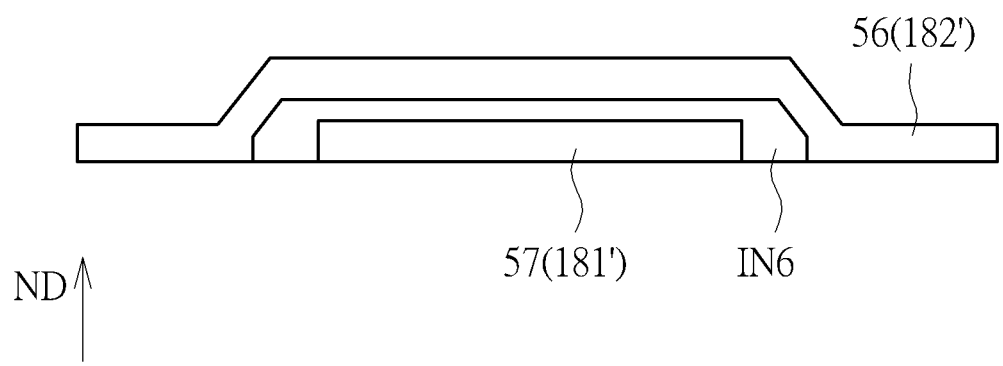
FIG. 11 schematically illustrates a cross-sectional view of FIG. 10 taken along a line D-D'.

Please refer to FIG. 10 and FIG. 11 simultaneously. FIG. 11 schematically illustrates a cross-sectional view of FIG. 10 taken along a line D-D'. As shown in FIG. 10, the second conductive layer 182' includes a plurality of signal wires 56, a plurality of signal wires 58 and a plurality of signal wires 60. The signal wires 56 are electrically connected to a plurality of sensing units 42a, the signal wires 58 are electrically connected to a plurality of sensing units 43a, and the signal wires 60 are electrically connected to a plurality of sensing units 41a. As shown in FIG. 11, the first conductive layer 181' further includes a plurality of conductive wires 57. In the normal direction ND, each of the conductive wires 57 may overlap one of the signal wires 56. Similarly, although not shown in FIG. 11, each of the conductive wires 57 may overlap one of the signal wires 58, and each of the conductive wires 57 may overlap one of the signal wires 60. In this way, the conductive wire 57 can shield the signal below and reduce the interference from the signal below to the signals transmitted by the signal wires 56, the signal wires 58 and the signal wires 60.

Figure 12:
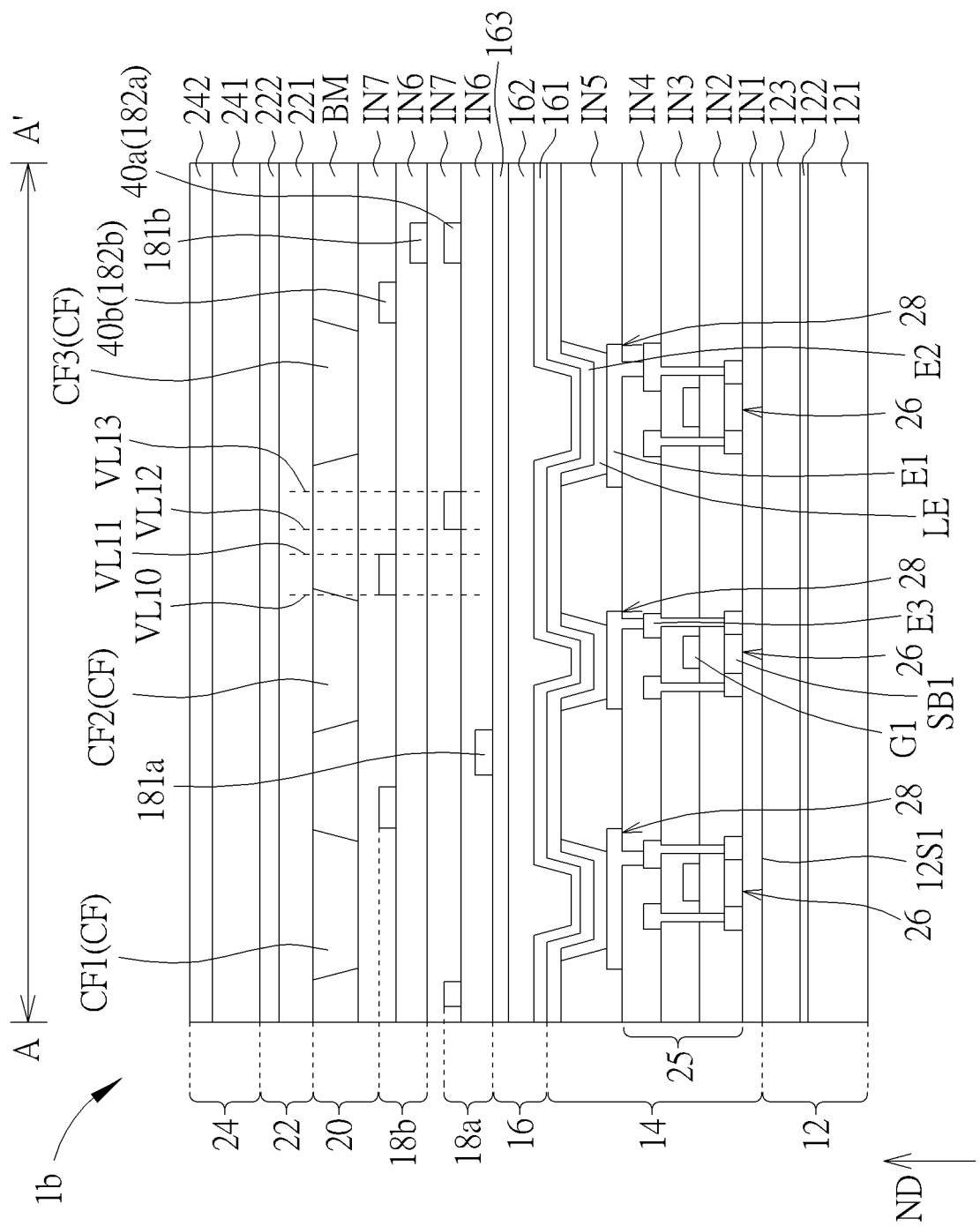
FIG. 12 schematically illustrates a cross-sectional view of an electronic device according to another embodiment of the present disclosure.

Please refer to FIG. 12, which schematically illustrates a cross-sectional view of an electronic device according to another embodiment of the present disclosure. In FIG. 12, the electronic device 1b may include a sensing structure 18a and a sensing structure 18b. The sensing structure 18a is disposed on the substrate 12 and includes a first conductive layer 181a, a second conductive layer 182a and an insulating layer IN6. The second conductive layer 182a is disposed on the first conductive layer 181a. The insulating layer IN6 is disposed between the first conductive layer 181a and the second conductive layer 182a. The sensing structure 18b may be disposed on the sensing structure 18a, and may include a third conductive layer 181b, a fourth conductive layer 182b, and an insulating layer IN6. The fourth conductive layer 182b is disposed on the third conductive layer 181b. The insulating layer IN6 is disposed between the third conductive layer 181b and the fourth conductive layer 182b. The electronic device 1b may further include an insulating layer IN7 disposed between the sensing structure 18a and the sensing structure 18b. The second conductive layer 182a may include a plurality of sensing units 40a, and the fourth conductive layer 182b may include a plurality of sensing units 40b. The sensing unit 40a may be configured to sense an input by an input device, and the sensing unit 40b may be configured to sense an input by touch. As shown in FIG. 12, the sensing unit 40a and the sensing unit 40b may be disposed on different planes. As shown in the virtual segment VL10, the virtual segment VL11, the virtual segment VL12 and the virtual segment VL13, the sensing unit 40a may be staggered with respect to the sensing unit 40b in the top view of the electronic device 1b. The term "staggered" herein may refer that the sensing unit 40a and the sensing unit 40b may not be completely overlapped with each other in the top view/bottom view. That is, the sensing unit 40a and the sensing unit 40b may partially overlap or not overlap with each other. However, in other embodiments, the sensing unit 40a may be configured to sense input by touch, and the sensing unit 40b may be configured to sense input by an input device.

Figure 13:
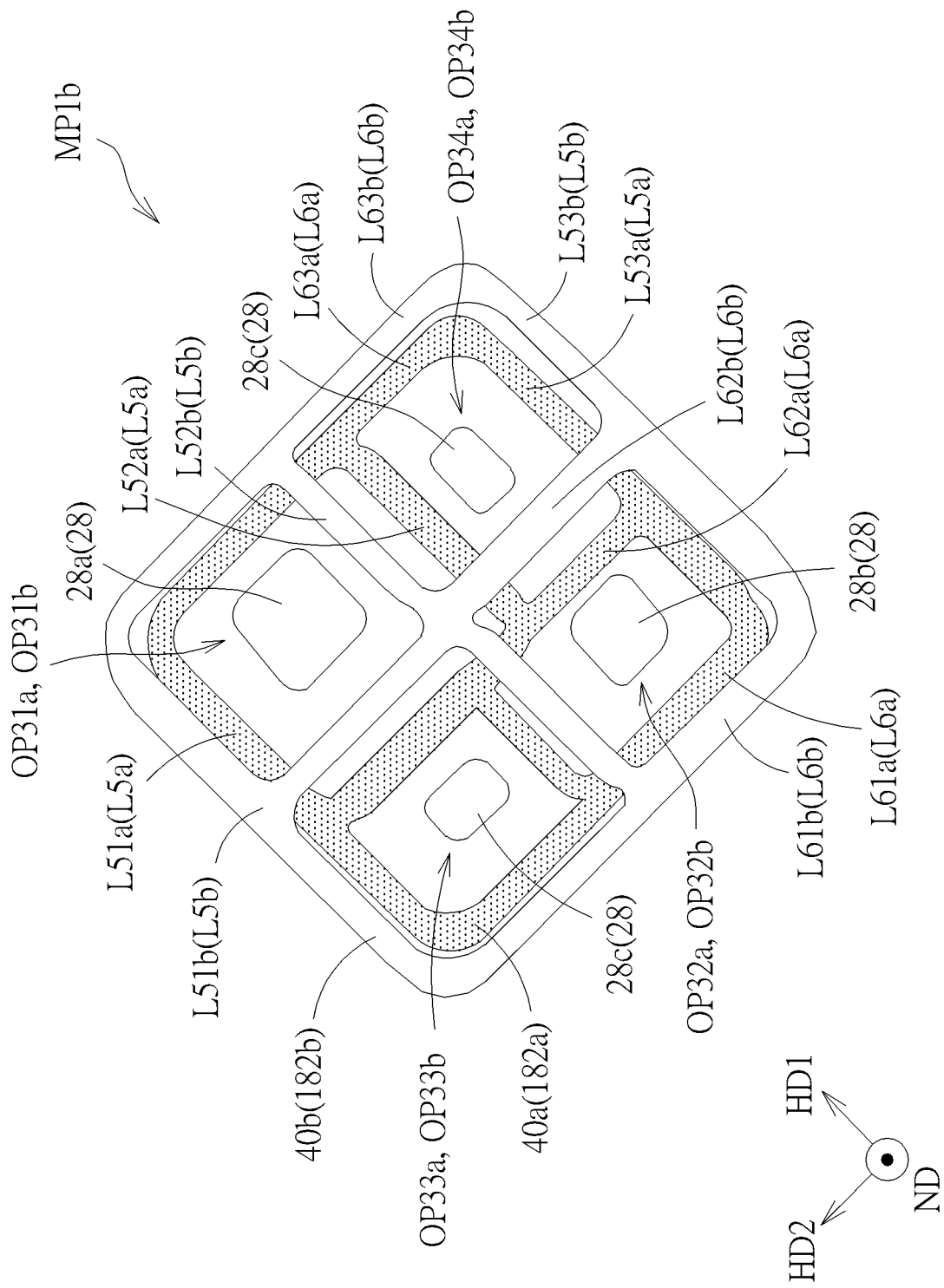
FIG. 13 schematically illustrates a partial top view of the electronic device shown in FIG. 12.

Please refer to FIG. 13, which schematically illustrates a partial top view of the electronic device shown in FIG. 12. In the portion MP1b of the electronic device 1b shown in FIG. 13, in order to clearly show the relationship between the portion of the sensing unit 40a (the second conductive layer 182a), the portion of the sensing unit 40b (the fourth conductive layer 182b) and the corresponding electronic units 28 thereof, other elements of the electronic device 1b are omitted. The sensing unit 40a may include a mesh (not labeled) formed by a plurality of segments L5a and a plurality of segments L6a. In the portion MP1b, the plurality of segments L5a may include a segment L51a, a segment L52a and a segment L53a, wherein the segment L51a, the segment L52a and the segment L53a are parallel to the direction HD1. The plurality of segments L6a may include a segment L61a, a segment L62a and a segment L63a, wherein the segment L61a, the segment L62a and the segment L63a are parallel to the direction HD2. The second conductive layer 182a further includes an opening OP31a, an opening OP32a, an opening OP33a and an opening OP34a in the portion MP1b. The sensing unit 40b may include a mesh (not labeled) formed by a plurality of segments L5b and a plurality of segments L6b. In the portion MP1b, the plurality of segments L5b may include a segment L51b, a segment L52b and a segment L53b, wherein the segment L51b, the segment L52b and the segment L53b are parallel to the direction HD1. The plurality of segments L6b may include a segment L61b, a segment L62b and a segment L63b, wherein the segment L61b, the segment L62b and the segment L63b are parallel to the direction HD2. The fourth conductive layer 182b further includes an opening OP31b, an opening OP32b, an opening OP33b and an opening OP34b in the portion MP1b. The opening OP31a and the opening OP31b may correspond to the electronic unit 28a, the opening OP32a and the opening OP32b may correspond to the electronic unit 28b, the opening OP33a and the opening OP33b may correspond to the electronic unit 28c, and the opening OP34a and the opening OP34b may correspond to the electronic unit 28c.

As shown in FIG. 13, the sensing unit 40a and the sensing unit 40b may partially overlap each other. For example, the segment L62a and the segment L62b do not overlap each other, while the segment L62a and the segment L52b partially overlap each other. For details of the electronic device 1b, reference may be made to the relevant description of electronic device 1 and are not repeated herein.

Figure 14:
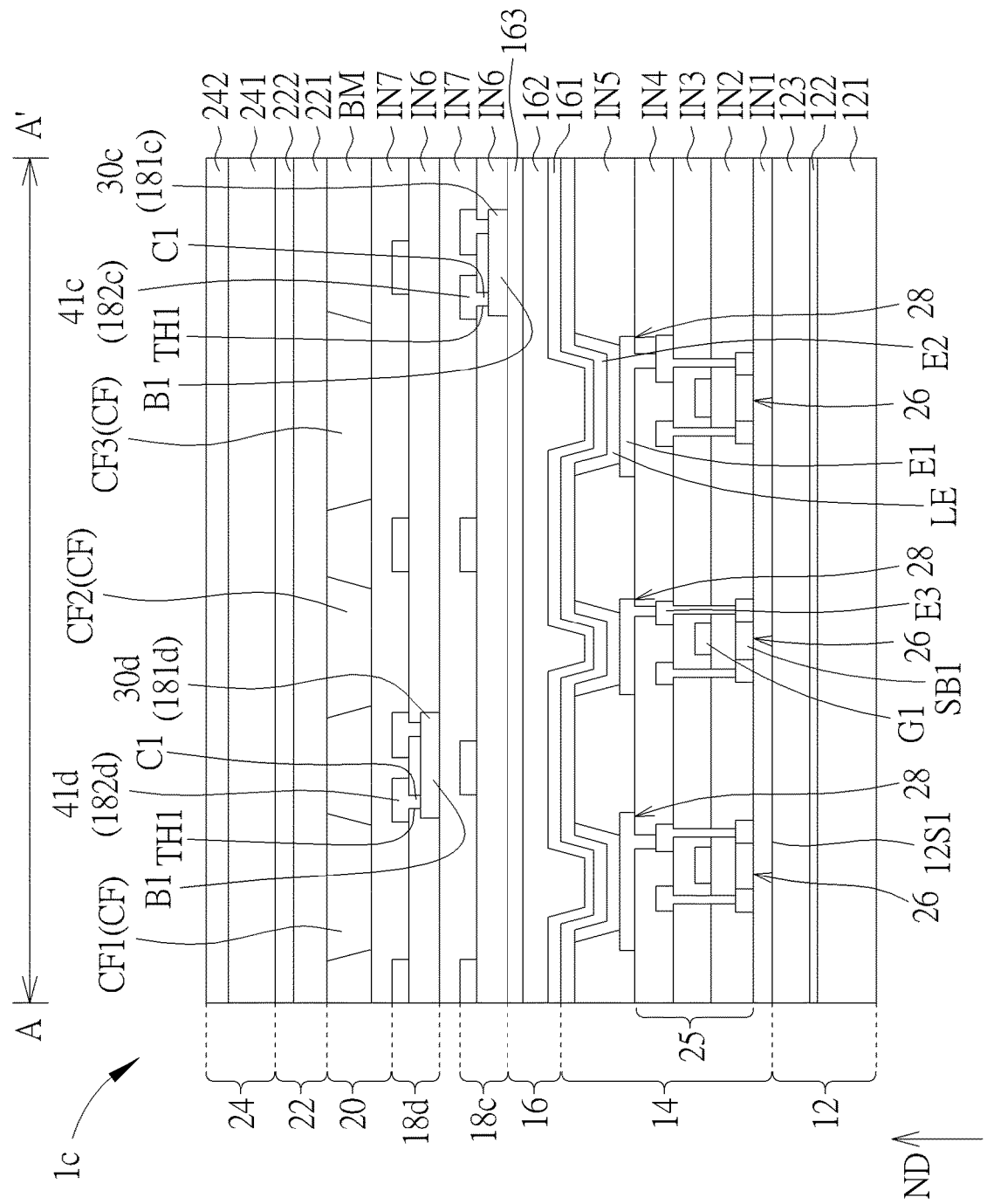
FIG. 14 schematically illustrates a cross-sectional view of an electronic device according to yet another embodiment of the present disclosure.
Figure 15:
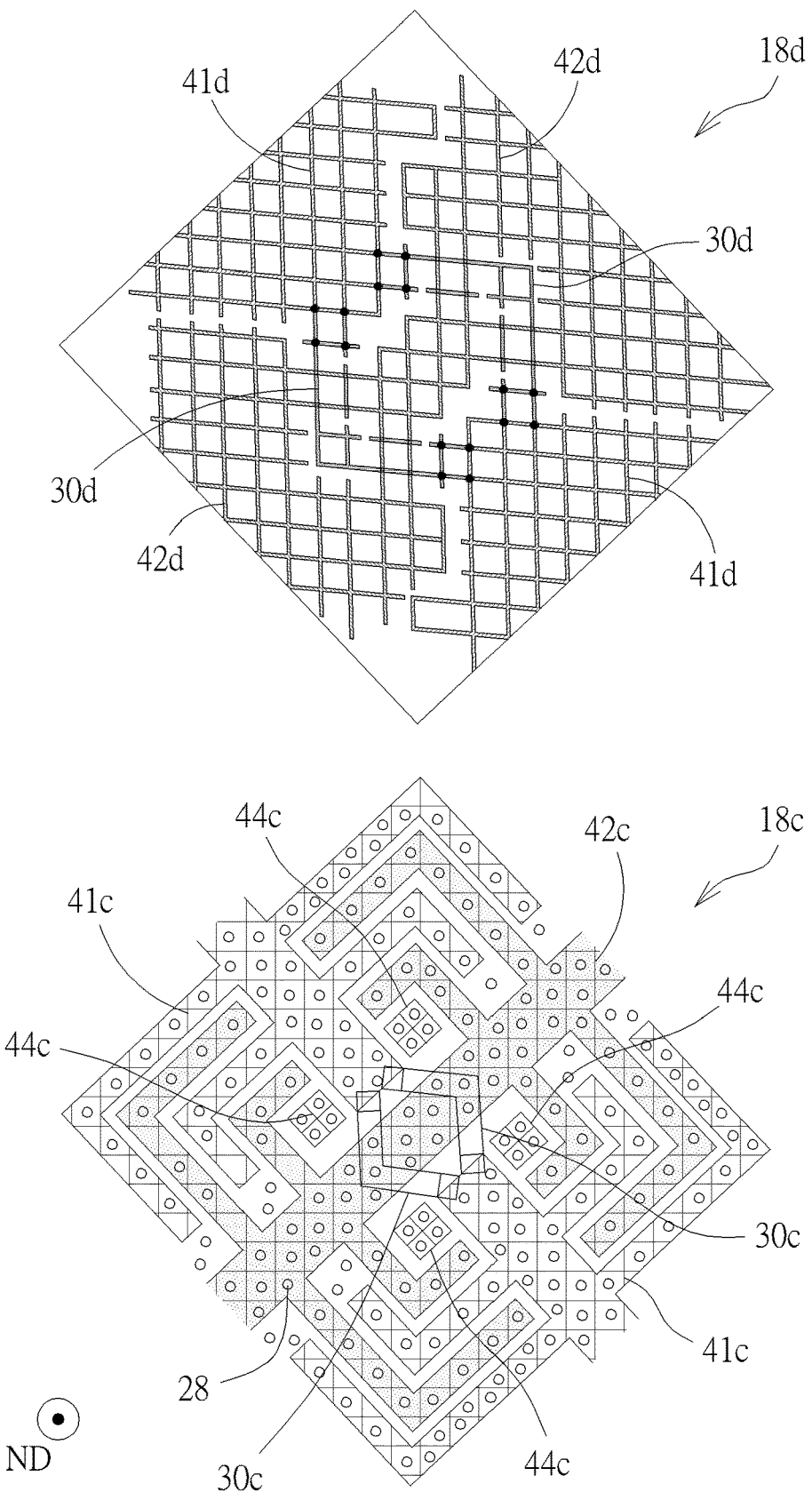
FIG. 15 schematically illustrates a partial top view of the electronic device shown in FIG. 14.

Please refer to FIG. 14 and FIG. 15. FIG. 14 schematically illustrates a cross-sectional view of an electronic device according to yet another embodiment of the present disclosure. FIG. 15 schematically illustrates a partial top view of the electronic device shown in FIG. 14. In FIG. 15, in order to clearly show the relationship between the sensing structure 18c, the sensing structure 18d and the corresponding electronic units 28 thereof, other elements of the electronic device 1c are omitted. Furthermore, in FIG. 15, in order to prevent the sensing structure 18d from shielding the sensing structure 18c, a larger gap is disposed between the sensing structure 18c and the sensing structure 18d. However, the sensing structure 18c and the sensing structure 18d actually have a small gap therebetween. The electronic device 1c may include a plurality of the portions shown in FIG. 15 connected with each other. In FIG. 14 and FIG. 15, the electronic device 1c may include the sensing structure 18c and the sensing structure 18d. The sensing structure 18c is disposed on the substrate 12 and includes a first conductive layer 181c, a second conductive layer 182c and an insulating layer IN6. The second conductive layer 182c is disposed on the first conductive layer 181c, and the insulating layer IN6 is disposed between the first conductive layer 181c and the second conductive layer 182c. The sensing structure 18d may be disposed on the sensing structure 18c, and may include a third conductive layer 181d, a fourth conductive layer 182d, and an insulating layer IN6. The fourth conductive layer 182d may be disposed on the third conductive layer 181d, and the insulating layer IN6 may be disposed between the third conductive layer 181d and the fourth conductive layer 182d. The electronic device 1c may further include an insulating layer IN7 disposed between the sensing structure 18c and the sensing structure 18d.

The first conductive layer 181c may include a plurality of connection units 30c, and the second conductive layer 182c may include a sensing unit 42c, a sensing unit 41c and a dummy unit 44c. In FIG. 15, the sensing unit 42c is presented with different ground pattern, which is for enhancing the recognition and does not have other meanings. In FIG. 15, two connection units 30c, one sensing unit 42c, two sensing units 41c and four dummy units 44c are shown. The two sensing units 41c are respectively disposed at two sides of the sensing unit 42c, and the dummy units 44c are disposed between the sensing unit 42c and the sensing unit 41c. The shape of the connection unit 30c may be substantially V-shaped in the top view/bottom view, and each of the connection units 30c is electrically connected to two adjacent sensing units 41c. As shown in FIG. 14, the insulating layer IN6 may include a plurality of vias TH1. The connection portion C1 of the sensing unit 41c of the second conductive layer 182c may be electrically connected to the bridge portion B1 of the connection unit 30c of the first conductive layer 181c through the via TH1.

The third conductive layer 181d may include a plurality of connection units 30d, and the fourth conductive layer 182d may include a sensing unit 41d and a sensing unit 42d. In FIG. 15, the sensing unit 41d, the sensing unit 42d and the connection unit 30d are presented with different ground patterns, which is for enhancing the recognition and does not have other meanings. In FIG. 15, two connection units 30d, two sensing units 41d and two sensing units 42d are shown. The shape of the connection unit 30d may be substantially V-shaped in the top view/bottom view. Each of the connection units 30d is electrically connected to two adjacent sensing units 41d. As shown in FIG. 14, the insulating layer IN6 may include a plurality of vias TH1. The connection portion C1 of the sensing unit 41d of the fourth conductive layer 182d may be electrically connected to the bridge portion B1 of the connection unit 30d of the third conductive layer 181d through the via TH1.

The sensing unit 41c and the sensing unit 42c may be configured to sense an input by an input device, and the sensing unit 41d and the sensing unit 42d may be configured to sense an input by touch. As shown in FIG. 14, the sensing unit 41c, the sensing unit 42c, the sensing unit 41d and the sensing unit 42d may be disposed on different planes. The connection units 30c may be staggered with respect to the connection units 30d in the top view/bottom view of the electronic device 1c. Thereby, the signal interference between the sensing structure 18c and the sensing structure 18d may be reduced. The term "staggered" herein may refer that the connection unit 30c and the connection unit 30d may not be completely overlapped with each other in the top view/bottom view. That is, the connection unit 30c and the connection unit 30d may partially overlap each other or may not overlap each other. However, in other embodiments, the sensing unit 41c and the sensing unit 42c may be configured to sense input by touch, and the sensing unit 41d and the sensing unit 42d may be configured to sense input by an input device.

Compared with the prior art, in the electronic device according to the present disclosure, the sensing structure is disposed on the substrate and located inside the electronic device, rather than being attached to an outside of the electronic device, which is beneficial to reduce the overall thickness and weight of the electronic device. Furthermore, in the sensing structure, the thickness of the first conductive layer disposed below is smaller than the thickness of the second conductive layer disposed above, which is beneficial to reduce the step difference of the second conductive layer, so that the uniformity of the overall thickness of the sensing structure can be enhanced.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a substrate; and
   a sensing structure disposed on the substrate, comprising a first conductive layer, a second conductive layer disposed on the first conductive layer, and an insulating layer disposed between the first conductive layer and the second conductive layer;
   wherein the second conductive layer is at least partially overlapped with the first conductive layer;
   wherein a thickness of the second conductive layer is greater than a thickness of the first conductive layer;
   wherein the first conductive layer comprises a plurality of first connection units, the second conductive layer comprises a plurality of sensing units, the insulating layer comprises a plurality of vias, and two adjacent ones of the sensing units electrically connect to one of the first connection units through at least two of the vias;
   wherein one of the first connection units comprises a plurality of first segments forming a first mesh, and one of the sensing units comprises a plurality of second segments forming a second mesh; and
   wherein the first conductive layer has a first overlapping region where one of the first segments crosses and overlaps one of the second segments, and a non-overlapping region where one of the first segments does not overlap one of the second segments, and a first width of the first overlapping region is greater than a width of the non-overlapping region.

2. The electronic device according to claim 1, wherein a ratio of the thickness of the first conductive layer to the thickness of the second conductive layer is greater than or equal to 0.1 and less than 1.

3. The electronic device according to claim 1, wherein the first conductive layer comprises a first top layer, a first bottom layer and a first middle layer disposed therebetween, the second conductive layer comprises a second top layer, a second bottom layer and a second middle layer disposed therebetween, and a thickness of the second middle layer is greater than a thickness of the first middle layer.

4. The electronic device according to claim 3, wherein a difference between the thickness of the second middle layer and the thickness of the first middle layer is greater than a difference between a thickness of the second bottom layer and a thickness of the first bottom layer.

5. The electronic device according to claim 1, wherein an end of one of the second segments is curved.

6. The electronic device according to claim 1, wherein the second mesh comprises a first opening and a second opening having different sizes.

7. The electronic device according to claim 6, wherein a ratio of an area of the first opening to an area of the second opening is greater than 1 and less than or equal to 25.

8. The electronic device according to claim 1, wherein the second conductive layer has a connection region where two of the second segments connect with each other, and a second width of the first overlapping region is less than a width of the connection region.

9. The electronic device according to claim 8, wherein the first conductive layer further has a second overlapping region where one of the first segments connects to and overlaps one of the second segments, and a width of the second overlapping region is greater than the width of the connection region.

10. The electronic device according to claim 1, wherein one of the second segments has a connection portion connecting to one of the first segments through one of the vias, the connection portion forms a recess having a bottom width and a top width, and a ratio of the top width to the bottom width is greater than 1 and less than or equal to 2.5.

11. The electronic device according to claim 1, wherein the second conductive layer further comprises a plurality of signal wires electrically connected to the plurality of sensing units, and the first conductive layer further comprises a plurality of conductive wires overlapping the signal wires respectively.

12. The electronic device according to claim 1, wherein the sensing structure is configured to sense a first input by touch in a first sensing mode and configured to sense a second input by an input device in a second sensing mode.

13. The electronic device according to claim 12, wherein the plurality of sensing units comprises a first sensing unit configured to sense the first input by touch and a second sensing unit configured to sense the second input by the input device.

14. The electronic device according to claim 13, wherein the second conductive layer further comprises a dummy unit disposed between the first sensing unit and the second sensing unit.

15. The electronic device according to claim 12, wherein the sensing structure further comprises a third conductive layer and a fourth conductive layer disposed on the third conductive layer, the fourth conductive layer comprises a plurality of third sensing units, the third sensing units are configured to sense the first input by touch and the sensing units are configured to sense the second input by the input device.

16. The electronic device according to claim 15, wherein the sensing units are staggered with respect to the third sensing units in a top view of the electronic device.

17. The electronic device according to claim 15, wherein the third conductive layer comprises a plurality of second connection units, one of the second connection units electrically connects two adjacent ones of the third sensing units, and the first connection units are staggered with respect to the second connection units in a top view of the electronic device.

18. An electronic device, comprising:
a substrate; and
a sensing structure disposed on the substrate, comprising a first conductive layer, a second conductive layer disposed on the first conductive layer, and an insulating layer disposed between the first conductive layer and the second conductive layer;
wherein the second conductive layer is at least partially overlapped with the first conductive layer;
wherein a thickness of the second conductive layer is greater than a thickness of the first conductive layer;
wherein the first conductive layer comprises a plurality of connection units, the second conductive layer comprises a plurality of sensing units, the insulating layer comprises a plurality of vias, and two adjacent ones of the sensing units electrically connect to one of the connection units through at least two of the vias;
wherein one of the connection units comprises a plurality of first segments forming a first mesh, and one of the sensing units comprises a plurality of second segments forming a second mesh; and
wherein one of the second segments has a connection portion connecting to one of the first segments through one of the vias, the connection portion forms a recess having a bottom width and a top width, and a ratio of the top width to the bottom width is greater than 1 and less than or equal to 2.5.

* * * * *